United States Patent
Zitlaw et al.

(10) Patent No.: US 11,422,968 B2
(45) Date of Patent: Aug. 23, 2022

(54) METHODS, DEVICES AND SYSTEMS FOR HIGH SPEED SERIAL BUS TRANSACTIONS

(71) Applicant: Infineon Technologies LLC, San Jose, CA (US)

(72) Inventors: Clifford Zitlaw, San Jose, CA (US); Stephan Rosner, Campbell, CA (US)

(73) Assignee: Infineon Technologies LLC, San Jose, CA (US)

( * ) Notice: Subject to any disclaimer, the term of this patent is extended or adjusted under 35 U.S.C. 154(b) by 0 days.

(21) Appl. No.: 17/030,664

(22) Filed: Sep. 24, 2020

(65) Prior Publication Data
US 2021/0279200 A1 Sep. 9, 2021

Related U.S. Application Data
(60) Provisional application No. 62/987,230, filed on Mar. 9, 2020.

(51) Int. Cl.
*G06F 13/42* (2006.01)
*G06F 9/38* (2018.01)

(52) U.S. Cl.
CPC ............ *G06F 13/4282* (2013.01); *G06F 9/38* (2013.01); *G06F 2213/0008* (2013.01)

(58) Field of Classification Search
None
See application file for complete search history.

(56) References Cited

U.S. PATENT DOCUMENTS

| | | | | |
|---|---|---|---|---|
| 5,519,847 | A * | 5/1996 | Fandrich | G11C 7/1039 365/185.33 |
| 5,533,204 | A * | 7/1996 | Tipley | G06F 13/36 710/108 |
| 7,941,591 | B2 * | 5/2011 | Aviles | G06F 12/0813 711/103 |
| 9,104,526 | B2 * | 8/2015 | Jeon | G06F 13/1647 |
| 9,600,436 | B2 * | 3/2017 | Garney | H04L 12/40058 |
| 9,892,081 | B2 * | 2/2018 | Garney | G06F 13/1642 |
| 9,977,606 | B2 * | 5/2018 | Kim | G06F 13/4282 |
| 2002/0174255 | A1 * | 11/2002 | Hayter | H04L 45/00 709/250 |

(Continued)

FOREIGN PATENT DOCUMENTS

| | | | | |
|---|---|---|---|---|
| EP | 1195686 | A2 * | 4/2002 | ............ G06F 11/141 |
| EP | 2926505 | B1 * | 8/2019 | ............ H04J 3/0697 |

OTHER PUBLICATIONS

'Extended SPI Bus' by Leonid Lobachev, Aug. 9, 2018. (Year: 2018).*

(Continued)

*Primary Examiner* — Steven G Snyder

(57) ABSTRACT

A method can include, by operation of a host device, initiating a first transaction with at least a first device on a serial bus in synchronism with a clock, the first transaction having a predetermined response latency. The host device can initiate a second transaction on the serial bus in synchronism with the clock signal during the response latency. The first transaction and second transaction can be completed on the serial bus in synchronism with the clock. The serial bus is configured to transmit instruction data identifying transactions, target data identifying a destination for transactions, and data for transactions. Corresponding devices and systems are also disclosed.

21 Claims, 19 Drawing Sheets

(56) References Cited

U.S. PATENT DOCUMENTS

| | | | |
|---|---|---|---|
| 2003/0065847 A1* | 4/2003 | Goodrum | G06F 13/364 |
| | | | 710/113 |
| 2010/0023674 A1* | 1/2010 | Aviles | H04L 67/1097 |
| | | | 711/103 |
| 2011/0283042 A1* | 11/2011 | Jeon | G06F 15/00 |
| | | | 711/5 |
| 2012/0210157 A1* | 8/2012 | Wang | G06F 13/4243 |
| | | | 713/500 |
| 2014/0281073 A1* | 9/2014 | Garney | G06F 13/405 |
| | | | 710/106 |
| 2017/0109065 A1* | 4/2017 | Kim | G06F 3/0613 |
| 2017/0255587 A1* | 9/2017 | Garney | G06F 13/1642 |
| 2018/0241546 A1* | 8/2018 | Leng | G06Q 20/027 |

OTHER PUBLICATIONS

George Crump, 'Quick Guide To Flash Storage Latency Wars,' Oct. 29, 2013. (Year: 2013).*

Jung et al., 'NANDFlashSim: Intrinsic Latency Variation Aware NAND Flash Memory System Modeling and Simulation at Microarchitecture Level,' copyright 2013, IEEE. (Year: 2013).*

* cited by examiner

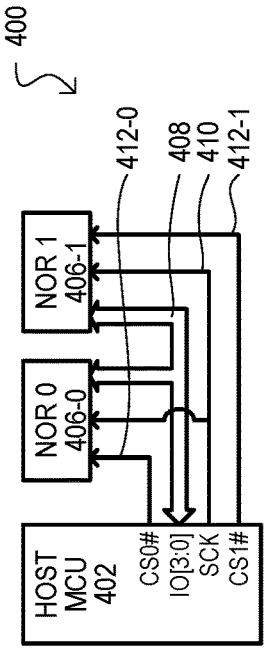
FIG. 4A
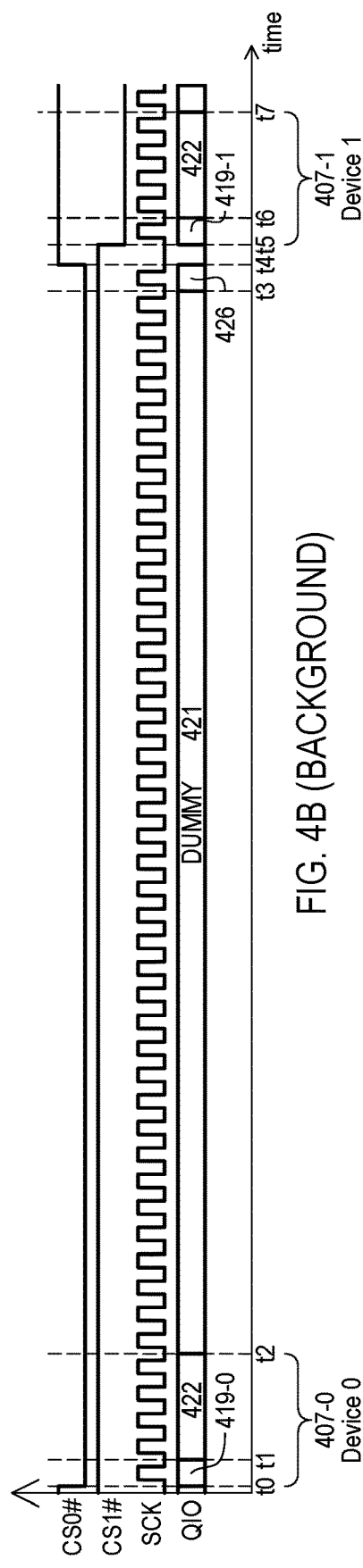
FIG. 4B (BACKGROUND)
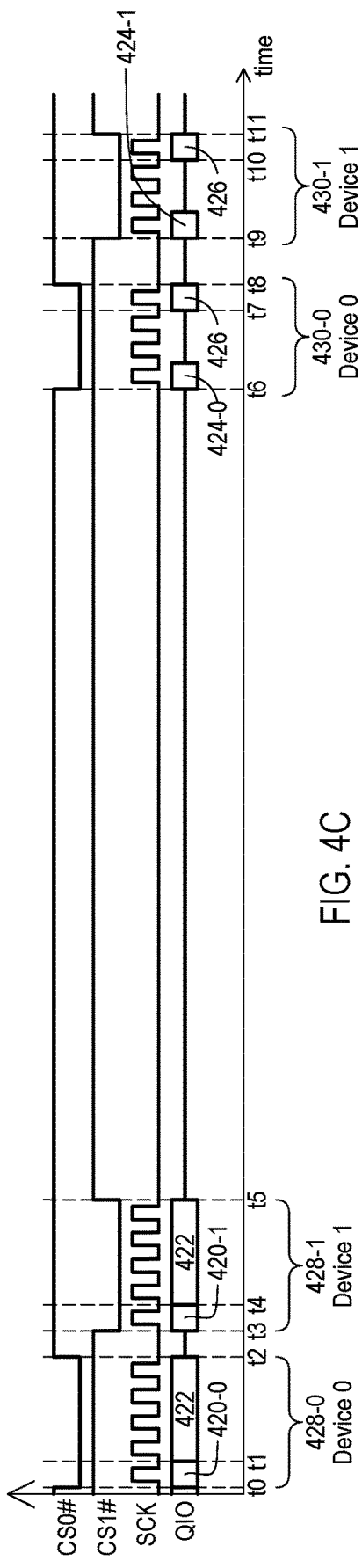
FIG. 4C

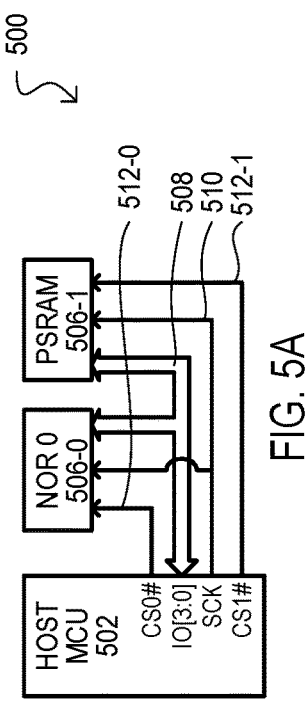
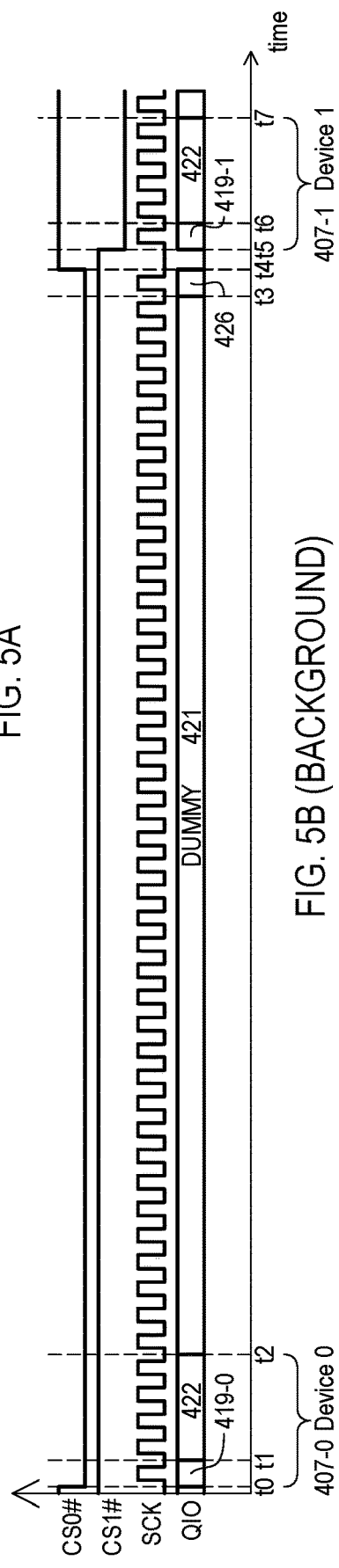
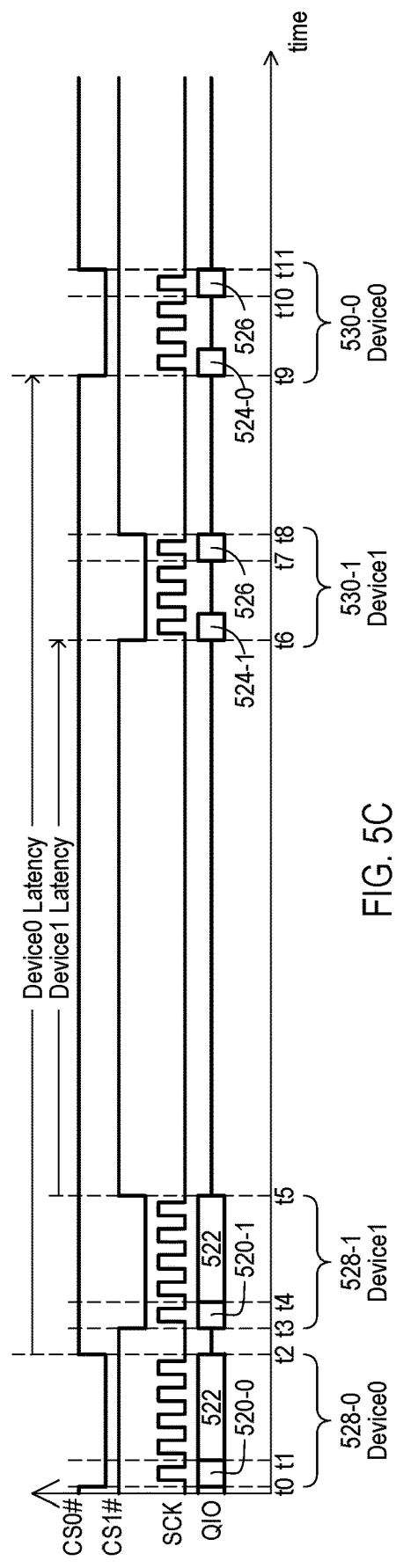

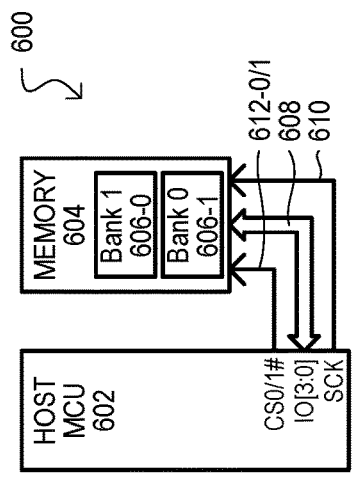
FIG. 6A
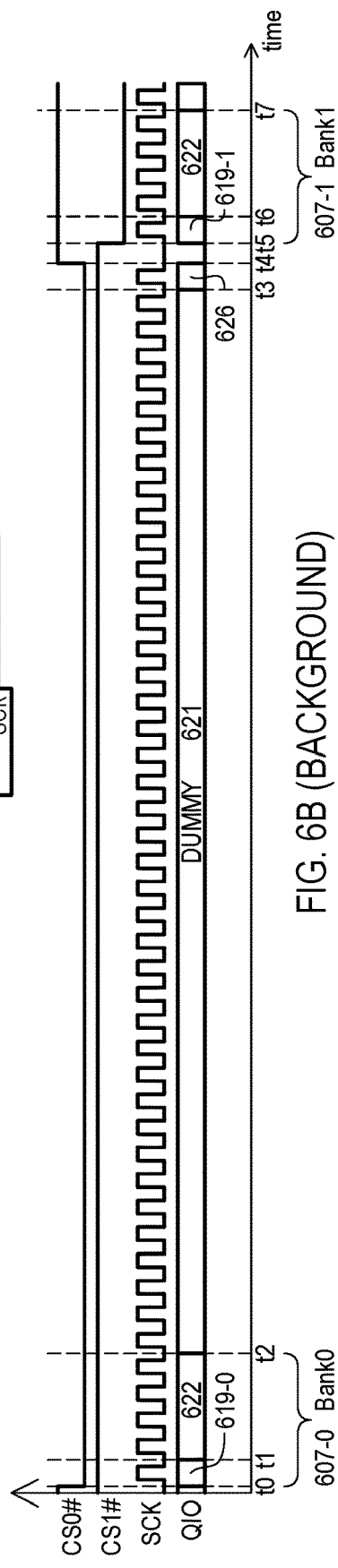
FIG. 6B (BACKGROUND)
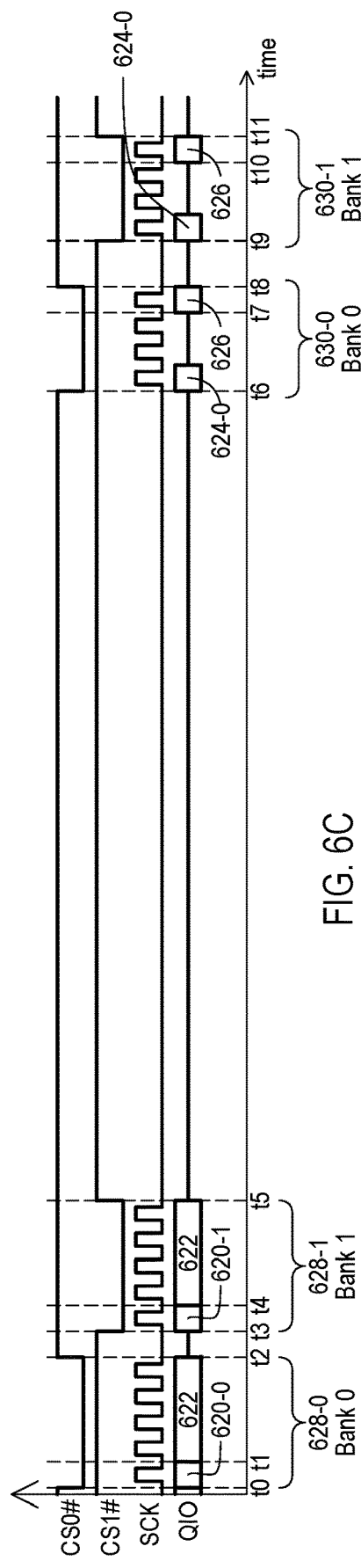
FIG. 6C

| Instruction | Description | Code(Hex) |
|---|---|---|
| SPLIT_READ_INI | Initiate Split Read | XX |
| SPLIT_WRITE_INI | Initiate Split Write | XX |
| SPLIT_READ_CMP | Complete Split Read | XX |
| SPLIT_WRITE_CMP | Complete Split Write | XX |

FIG. 11A

| Instruction | Description | Code(Hex) |
|---|---|---|
| SPLIT_READ | Initiate Split Read | XX |
| SPLIT_WRITE | Initiate Split Write | XX |
| RDSR2 | Read Status/ Complete Split Read/Write | 07 |

FIG. 11B

| Instruction | Description | Code(Hex) |
|---|---|---|
| RSFDP | Read Parameters (Including Split Transaction Ability) | 5A |

FIG. 11C

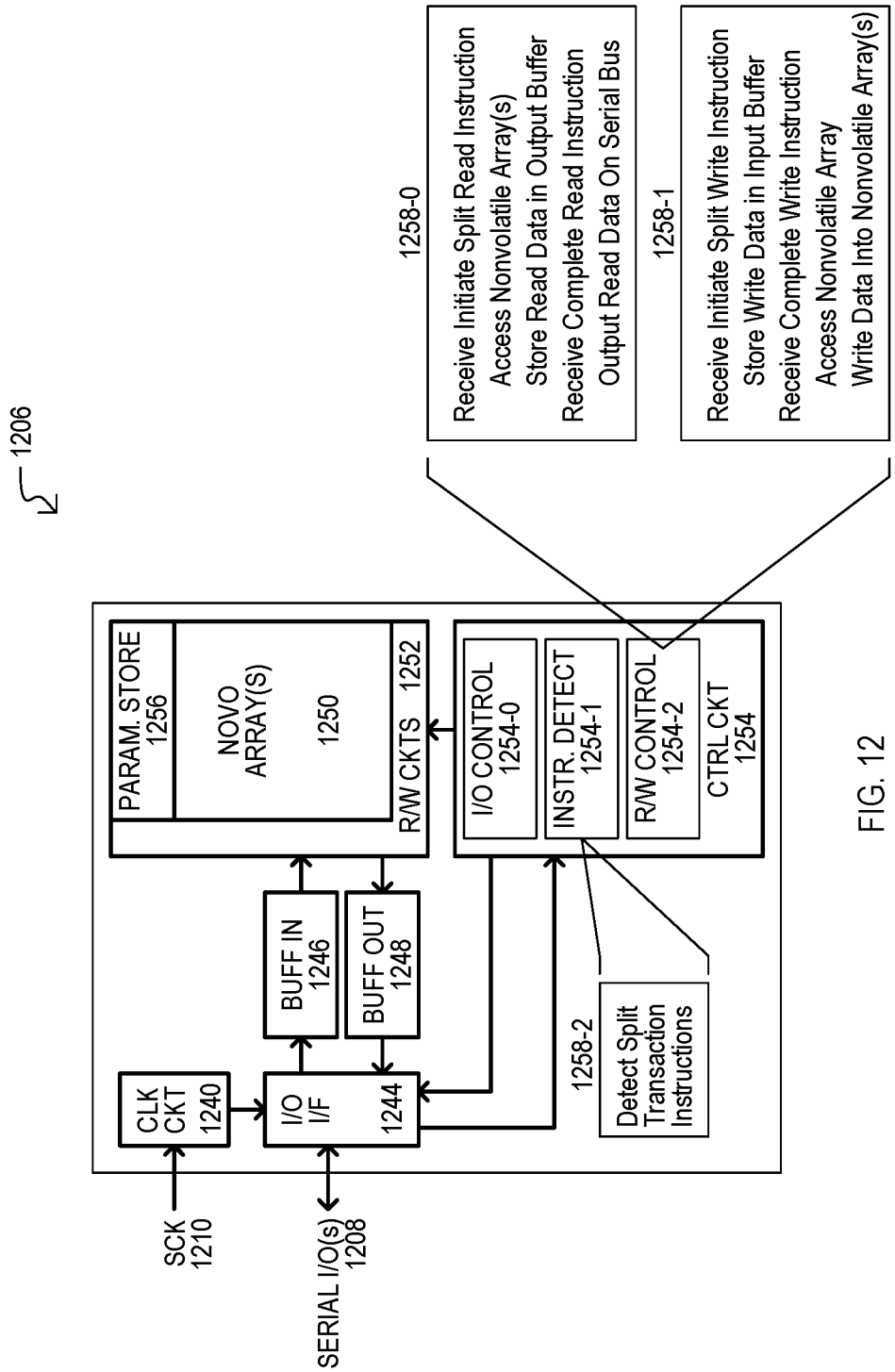

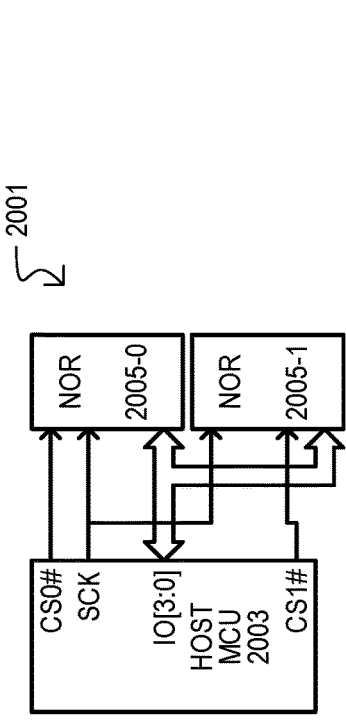
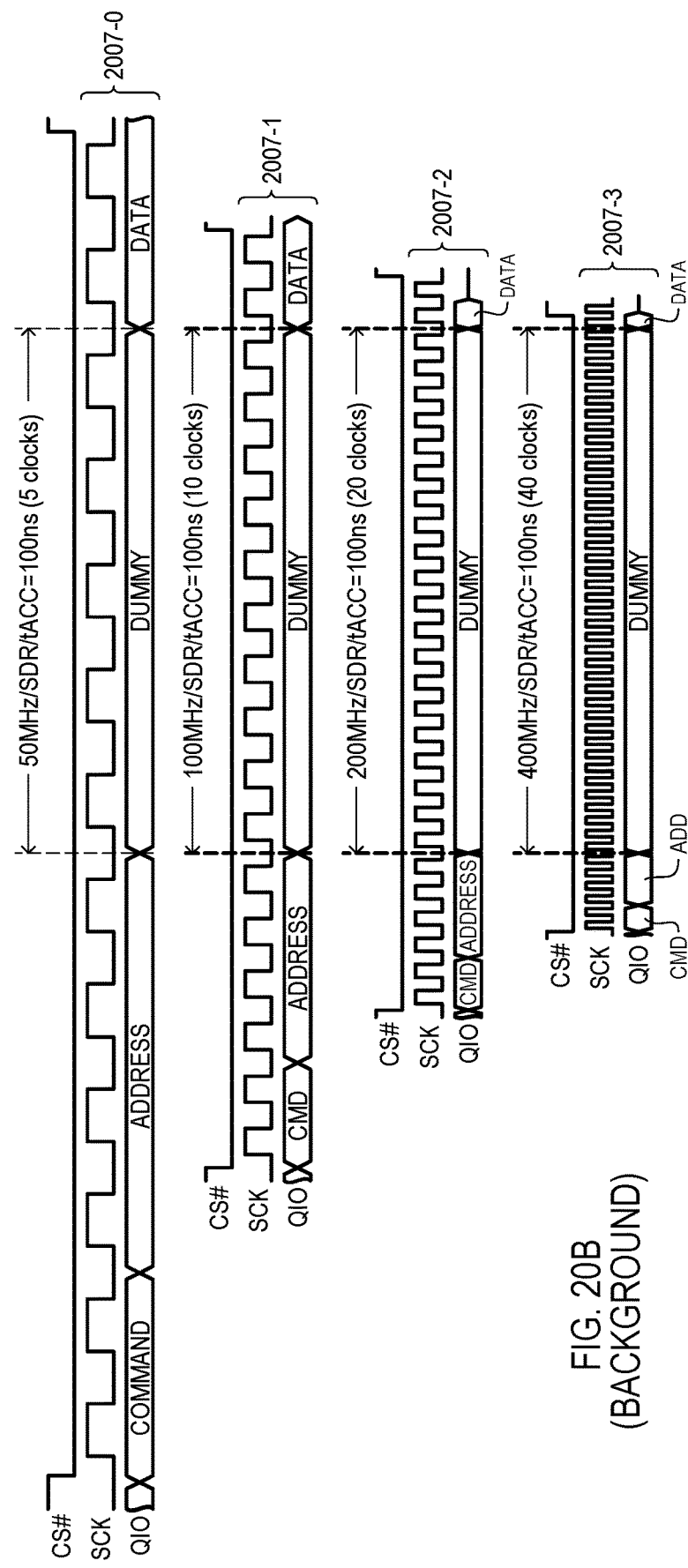
FIG. 20A (BACKGROUND)
FIG. 20B (BACKGROUND)

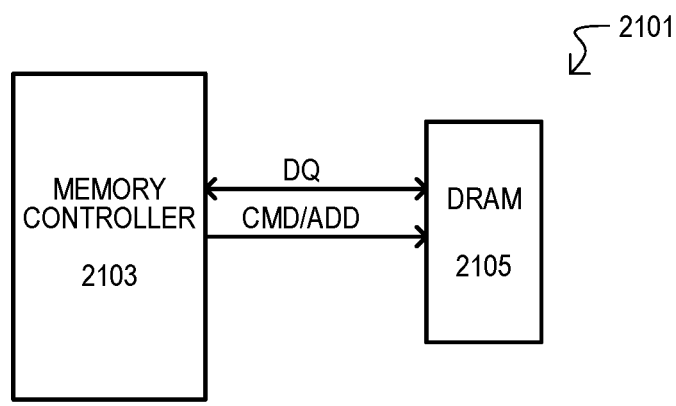
FIG. 21 (BACKGROUND)

US 11,422,968 B2

METHODS, DEVICES AND SYSTEMS FOR HIGH SPEED SERIAL BUS TRANSACTIONS

RELATED APPLICATIONS

This application claims the benefit of U.S. provisional patent application having Ser. No. 62/987,230, filed on Mar. 9, 2020, the contents of which are incorporated by reference herein.

TECHNICAL FIELD

The present disclosure relates generally to systems that execute transactions on serial buses, and more particularly to systems in which a host device executes transactions with one or more peripheral devices having predetermined latencies.

BACKGROUND

Advanced applications, such as automobile electronics, have a need for increased bandwidth from nonvolatile memories, such as NOR Flash memories. At the same time, in such systems it can be necessary to keep the number of device pins to a minimum.

FIG. 20A is a block diagram of a conventional memory system 2001 according to an embodiment. A system 2001 can include a host microcontroller unit (MCU) 2003, a first NOR flash device 2005-0 and a second NOR flash device 2005-1. MCU 2003 can be connected to NOR flash devices 2005-0/1 by a "quad" serial bus IO[3:0].

FIG. 20B shows timing diagrams for conventional single byte accesses to NOR flash devices for systems like that of FIG. 20A. In a conventional access, a chip select signal CS # can go low, selecting the NOR flash device. Command and address data can then be transmitted on the serial bus. Such accesses to the NOR flash device can have an access latency.

Timing diagrams 2007-0 and 2007-1 show conventional single data rate (SDR) accesses at a 50 MHz and 100 MHz clock speed, respectively. Timing diagrams 2007-2 and 2007-3 show conventional double data rate (DDR) accesses at a 200 MHz and 400 MHz clock speed, respectively. As noted above, NOR flash devices have a latency (indicated as "DUMMY" in FIG. 20A). Accordingly, following command and address data, there will be some delay before valid data can be output by the NOR device on the serial bus. During this time, a host device can wait for a number of "dummy" cycles of the serial clock SCK.

FIG. 20B shows how command/address/data time on the serial bus has substantially decreased as clock speeds and data rates have increased. However, while the transaction overhead has been minimized, the dummy period has remained relatively constant. As a result, the number of dummy cycles has increased. As shown, while a system operating at 50 MHz would include 5 clocks during a 100 ns latency period, a 400 MHz system would include 40 clocks during the 100 ns latency period.

While other types of systems have the potential of faster data throughput, such systems rely on separate data and command buses. For example, FIG. 21 shows a conventional dynamic random access memory (DRAM) system 2101. A system 2101 can execute pipelined instructions, with command and address data being issued by a memory controller 2103 on one unidirectional bus (ADD/CMD), while data can be received or transmitted by a DRAM 2105 on a bidirectional data bus DQ. Such capabilities require separate buses, however, unlike the arrangement of FIGS. 20A and 20B.

It would be desirable to arrive at someway of increasing the speed (e.g., data throughput) of a system having a serial bus that transmits both command and address values, as well as corresponding transaction data (e.g., read or write data).

BRIEF DESCRIPTION OF THE DRAWINGS

FIGS. 4A to 4C are diagrams showing a system executing split transactions with peripheral devices having a same or similar latency, according to embodiments.

FIGS. 5A to 5C are diagrams showing a system executing split transactions with peripheral devices having different latencies, according to embodiments.

FIGS. 6A to 6C are diagrams showing a system executing split transactions with different portions of a same peripheral device, according to embodiments.

FIGS. 11A to 11C are tables showing split transactions instructions according to embodiments.

FIG. 12 is a block diagram of a memory device according to an embodiment.

FIGS. 20A and 20B are diagrams showing a conventional memory system and operations.

FIG. 21 is a block diagram of a conventional split bus system.

DETAILED DESCRIPTION

Figure 1A:
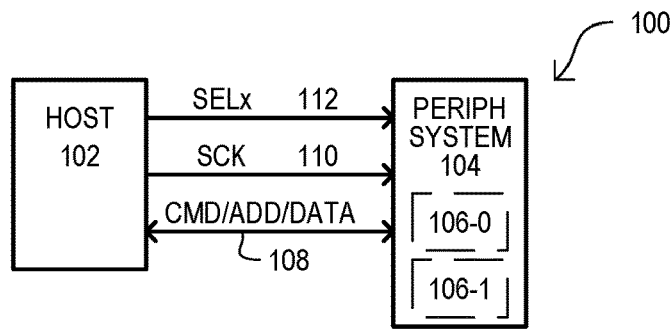
FIGS. 1A and 1B are diagrams showing a system having a serial bus on which transactions can be split according to embodiments.

According to embodiments, a system can include a host device that can execute split transactions on serial bus. Split transactions can include the host device initiating operations in peripheral devices on the serial bus, and then subsequently completing such transactions at desired times. In some embodiments, transactions can be initiated in a pipelined fashion, including initiating a transaction during a latency period of a previous transaction.

In some embodiments, a host device can split transactions for memory devices on the serial bus. This can include splitting transactions between memory devices having different latencies, as well as splitting transactions between different portions (e.g., banks) of the same memory device.

In some embodiments, transactions can be initiated by the host device sending a first instruction to a peripheral device. Transactions can be completed by the host device sending a second instruction to the peripheral device.

In some embodiments, a host device can acquire parameter information for peripheral devices on the serial bus to determine if the peripheral devices can execute split transactions. The host device can then issue split transaction commands to such peripheral devices. In some embodiments, a host device can include a scheduler for optimizing the use of split transactions.

In the various embodiments below, like items are referred to by the same reference characters, but with the leading digit(s) corresponding to the figure number.

FIG. 1A is a block diagram of a system 100 according to an embodiment. A system 100 can include a controller (e.g., host) device 102 and a peripheral system 104. A controller device 102 can communicate with the peripheral system 104 over a serial bus 108 that can transmit and receive data in synchronism with a serial clock (SCK) 110. A serial bus 108 can be a bidirectional bus that can transmit command (e.g., instruction), address and data values (CMD/ADD/DATA). A peripheral system 104 can include one or more target locations (two shown as 106-0/1). Target locations 106-0/1 can include, but are not limited to, different devices, different portions of a same device, or different functions of the same device. In some embodiments, target locations 106-0/1 can be selected by address or similar information transmitted on serial bus 108, one or more select signals (SELx) 112 transmitted by the controller device 102, or a combination thereof. It is understood that select signals SELx are separate from the serial bus 108.

A controller device 102 and a peripheral system 104 are capable of executing split transactions. A split transaction can be in contrast to a conventional transaction. In a conventional transaction, a controller device can issue a command (e.g., instruction) on the serial bus and a peripheral system can return results corresponding to the command with a predetermined latency (e.g., predetermined number of clock cycles). Unlike a conventional transaction, in a split transaction, a controller device can issue a command which can start a transaction. Completion of the transaction may or may not be timed according to an output from the controller device. In some embodiments, split transactions can be asynchronous transactions with respect to the peripheral device.

Figure 1B:
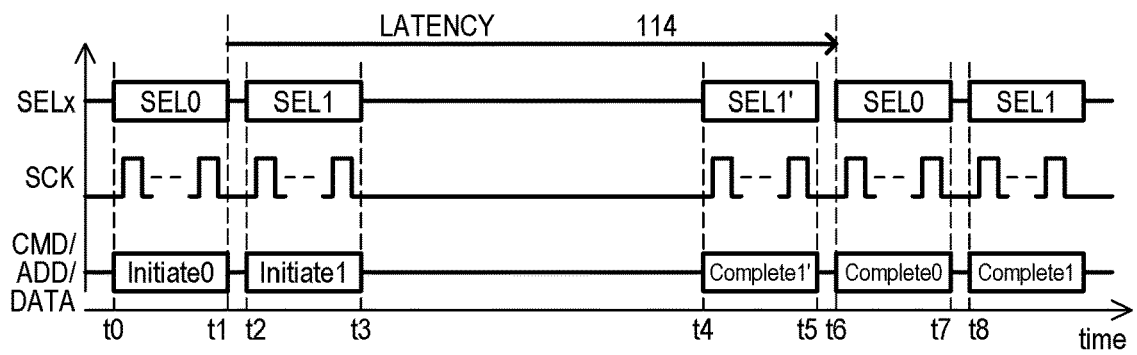

FIG. 1B is a timing diagram showing split transaction operations for the system of FIG. 1A according to embodiments. FIG. 1B includes a number of waveforms: SELx shows select signals used to select different target locations within a peripheral system 104; SCK shows a serial clock; and CMD/ADD/DATA shows actions on a serial bus. FIG. 1B shows one embodiment of pipelined operations, where multiple transactions (in this case two) can be initiated one after the other and then subsequently completed.

Referring still to FIG. 1B, at time t0 a controller device can initiate a first transaction having a destination indicated by select signal value SEL0. Such an action can include the controller device transmitting command data on the serial bus in synchronism with SCK. Optionally, such an action can also include issuing address and/or other data.

At time t1, the initiation of the first transaction can be complete. In the embodiment shown, a first transaction can have an inherent latency 114. That is, once the first transaction is initiated, a peripheral system may not provide results until time t6.

At time t2, controller device can initiate a second transaction having another destination indicated by select signal value SEL1. As in the case of the first transaction, such an action can include the controller device transmitting command data on the serial bus in synchronism with SCK (and possibly with address or other data). In the embodiment shown, SCK can be disabled between times t1 and t2. This is in contrast to conventional approaches which maintain SCK throughout an access operation. However, in other embodiments, SCK may not be disabled. Further, initiating the second transaction can occur in the latency period 114. Conventionally, such a period can be occupied by SCK cycles in which there can be no valid activity on the serial bus (i.e., "dummy" cycles).

At time t3, once the second transaction has been initiated, a controller device can disable SCK. Again, this is in contrast to conventional approaches, which can maintain dummy SCK cycles However, in other embodiments, SCK may not be disabled. It is understood that while FIG. 1B shows a controller device initiating two pipelined transactions, other embodiments can issue more pipelined transactions.

In some embodiments, a second transaction can have a smaller latency than that of the first transaction. Consequently, the second transaction can be completed prior to the first transaction. Such an arrangement is shown at time t4.

At time t4, a peripheral system can complete a second transaction. Such an action can include transmitting data in synchronism with SCK, thus SCK can resume at (or prior to) time t4. In some embodiments, such an action can also include the controller device signaling the peripheral system on the serial bus or via a signal outside of the serial bus or vice versa (the peripheral system signaling the controller device).

At time t5, a second transaction can be complete. In the embodiment shown, SCK can be disabled between times t5 and t6.

At time t6, following latency period 114, a peripheral system can complete the first transaction. Such an action can include transmitting data in synchronism with SCK, with SCK resuming at (or prior to) time t6. In some embodiments, such an action can also include the controller device signaling the peripheral system on the serial bus or via a signal outside of the serial bus or vice versa. It is noted that while a first operation can be completed within a minimum latency period 114 (i.e., the lowest latency achievable by the peripheral system), in some embodiments, completion of the first transaction can be deferred to a time following a minimum latency period. As but one example, a controller device may include a scheduler which may defer completion of the first operation based on competing requests to peripheral devices.

At time t7, the first transaction can be complete. In the embodiment shown, SCK can be disabled between times t7 and t8.

In embodiments where a second transaction does not have a smaller latency than that of the first transaction, or has a lower priority than the first transaction, the second transaction can be completed after the first transaction. Such an arrangement is shown at time t8.

In some embodiments, pipelined transactions can be completed automatically by a peripheral device following a predetermined latency period. However, in other embodiments, the completion of a transaction can be elicited by an output from the controller device or a peripheral device (i.e., slave). Such an arrangement is shown in FIG. 2.

Figure 2:
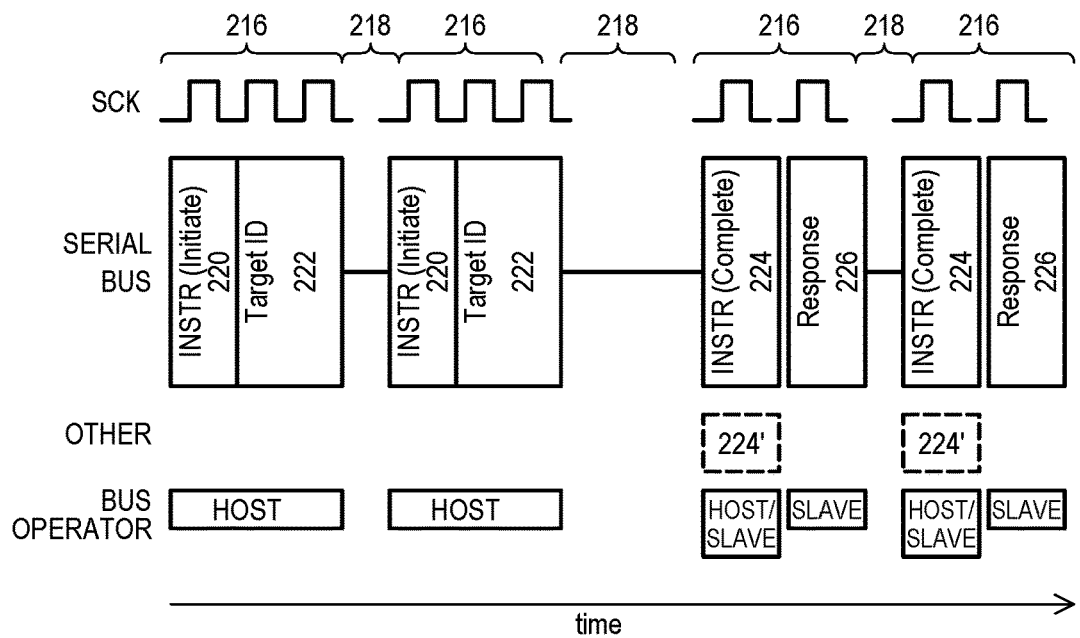
FIG. 2 is a timing diagram showing split transactions according to embodiments.

FIG. 2 is a timing diagram showing the initiation and completion of transactions on a serial bus according to an embodiment. FIG. 2 shows: a serial clock (SCK); actions that occur on a serial bus in synchronism with SCK (SERIAL BUS); actions that occur but are not on the serial bus (OTHER); and which device is operating the serial bus (BUS OPERATOR). Time periods 216 indicate when SCK is active and time periods 218 indicate when SCK is inactive.

A host (e.g., controller) device can issue instructions to initiate transactions 220 with corresponding target information 222 identifying a target for the transaction. Target information 222 can include any suitable information, including but not limited to a memory address or register address. Instructions 220 can be pipelined, being issued one after another on the serial bus without any intervening commands or signals. SCK can be inactive (or active) between instruction/target information pairs 220/222. Once all pipelined instructions have been issued, SCK can be deactivated (but in other embodiments may remain active).

After a predetermined latency period from among all pipelined instructions, a host device or peripheral device can elicit the completion of a transaction. In some embodiments, this can include a host issuing a completion instruction 224 on the serial bus. However, in other embodiments, this can include the host or peripheral device issuing a completion indication 224' via another means (i.e., not on the serial bus). For example, the host or peripheral device can activate a signal that is not part of the serial bus.

In response to the host or peripheral device eliciting the completion of a transaction, a peripheral device can generate a response 226. A response 226 can include any response suitable to the transaction, including but not limited to: returning requested data, returning an acknowledgement that the transaction is complete, or a combination thereof. The remainder of the transactions initiated previously can then be completed in the same fashion. In the embodiment shown, SCK can be deactivated between completions of the subsequent transactions, but on other embodiments SCK can remain active.

Figure 3:
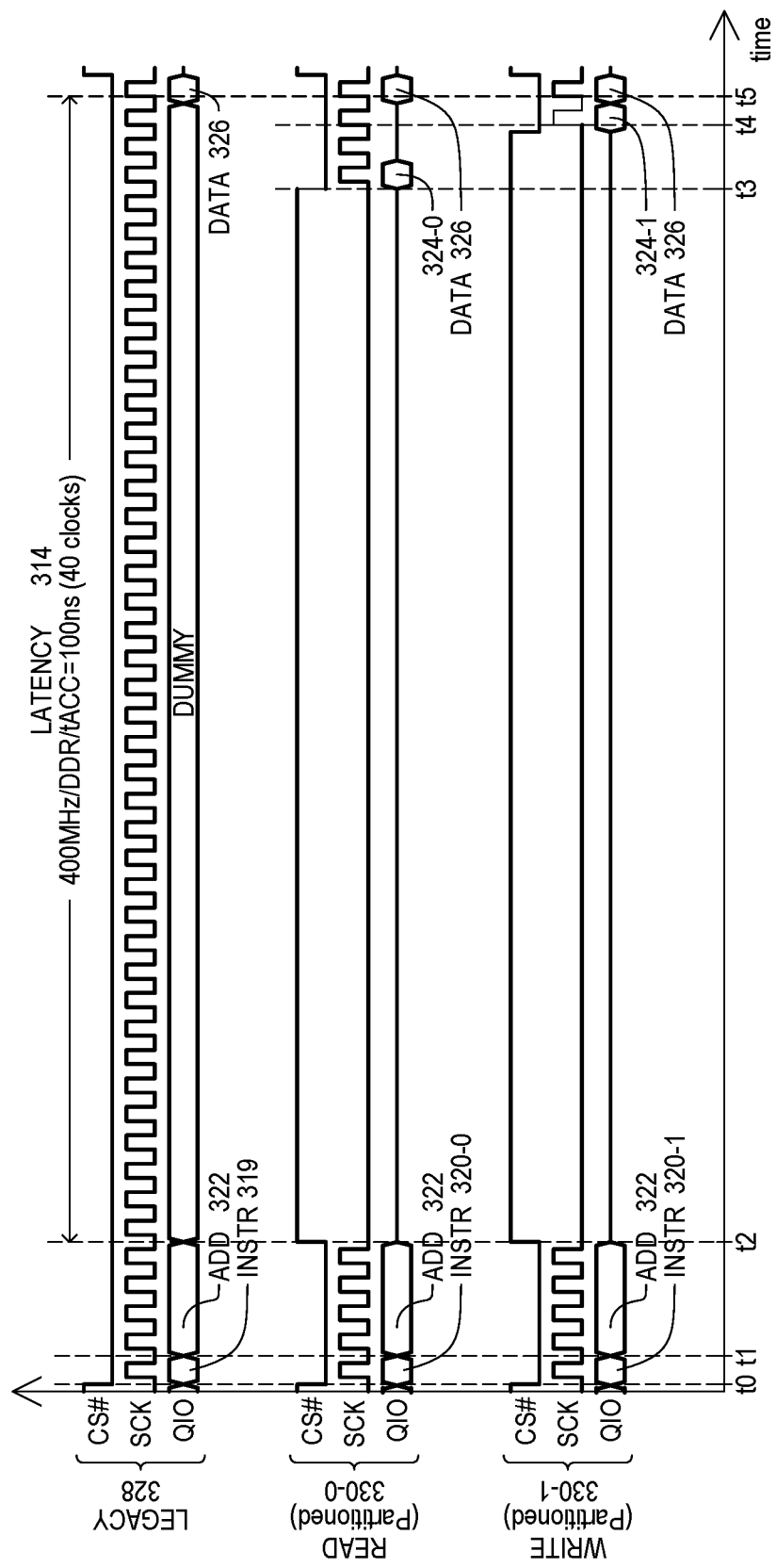
FIG. 3 is a timing diagram showing split read and write transactions according to embodiments.

While split transactions according to embodiments can be implemented in any suitable bus, in some embodiments split transactions can occur on a serial peripheral interface (SPI) bus or equivalent. FIG. 3 is a timing diagram comparing a conventional transaction to split transactions according to embodiments on a SPI bus.

FIG. 3 shows a conventional (i.e., legacy) read operation 328, a split (i.e., partitioned) read operation 330-0 according to an embodiment, and a split write operation 330-1 according to an embodiment. The operations 328 and 330-0/1 include waveforms for: a chip select signal (CS #) which can select a device when active (low); a serial clock (SCK), and a "quad" IO serial bus (QIO) which can include four serial data lines. The operations 328 and 330-0/1 can be issued by a host device to a peripheral memory device.

In the embodiment shown, operations on QIO can occur at a double data rate (DDR) (i.e., data transmitted in synchronism with rising and falling edges of SCK). However, other embodiments can include all or portions of transactions occurring at a single data rate (i.e., data transmitted in synchronism with only a rising or falling edge of SCK). FIG. 3 shows SCK operating at 400 MHz, however SCK can have any suitable speed for a given application or system. While FIG. 3 shows a quad IO, alternate embodiments can include fewer or greater numbers of serial lines.

The legacy read operation 328 will now be described.

At time t0 CS # can be activated to select a memory device. In synchronism with SCK, a conventional read instruction 319 can be issued on QIO followed by a read address 322. A memory device, such as a NOR flash memory, and so can have a latency 314 of about 100 ns, or 40 clock cycles of SCK. The latency period is occupied by "dummy" cycles.

At time t5, all dummy cycles having been completed, the peripheral device can output read data 326 on QIO. In the example shown, read data can be one byte. It is noted that both SCK and CS # remain active during the dummy cycles.

After the read data has been output, CS # can be deactivated (i.e., return high).

Split operations 330-0/1 in FIG. 3 describe the partitioning of READ and WRITE transactions into two separate operations. In the period separating the two operations, CS # can be inactive. In some embodiments, SCK can be inactive in this period as well.

A split read operation 330-0 according to embodiments will now be described.

At time t0, the split read transaction can be initiated by a host device (e.g., microcontroller unit, MCU) driving CS # LOW and specifying the split READ command 320-0 and a target address 322 on QIO in synchronism with SCK. Once the target address 322 has been defined the CS # signal can return HIGH. A target memory device (e.g., a NOR flash memory), upon receiving the split READ command 320-0 and target address 322 can launch an internal READ operation. The internal array (read) operation can occur in an asynchronous manner.

At time t3, following a sufficient amount of the latency period 314 elapsing, the targeted read data can have been retrieved from the array and will be ready for output. The host device can issue a second (e.g., completion) READ command 324-0 on QIO to extract the target data from the peripheral device. In some embodiments, the sufficient amount of latency period 314 can be determined by the host device counting cycles of SCK or with a READY/BUSY signal output by the memory device. Note that during the latency period the CS # signal is idle (HIGH) and the SCK is not active (i.e., not toggling). The second READ transaction can include an initial command indicating that the target data should be output. During this completion of the transaction, a small bus turn-around time may be required to allow the host device to release the bus. In the embodiment shown, this can include two cycles.

At time t5, read data 326 can be output on QIO by the memory device. As in the case of the conventional read operation 328, the split READ operation 330-0 is a byte read operation. However, embodiments anticipate read data sizes of larger or smaller sizes.

It is noted that the "idle" period on the serial bus and SCK can advantageously provide energy savings as compared to conventional approaches that can drive the bus with dummy data values. Such savings can be particular advantageous in applications that can transfer large amounts of data in at a single time, such as systems employing execute-in-place (XiP) type operations.

A split write operation 330-1 according to embodiments will now be described.

At time t0, the split write transaction can be initiated by a host device by driving CS # LOW and specifying the split WRITE command 320-1 and a target address 322 on QIO. Once the target address 322 has been defined the CS # signal can return HIGH.

Following some amount of latency elapsing, the memory device can be prepared to write data values into an array or the like. The host device can issue a second (e.g., completion) WRITE command 324-0 on QIO to write data into the peripheral device. While FIG. 3 shows the latency value being the same as the split READ operation (i.e., occurring at time t3), in other embodiments, a split WRITE operation can have a considerably shorter latency (including zero latency).

Having described split transactions according to embodiments, systems compatible with such transactions will now be described.

FIGS. 4A to 4C are diagrams showing a system that can pipeline split transactions for target destinations having a same or similar latency. FIG. 4A is a block diagram of a system 400. FIG. 4B is a timing diagram showing conventional accesses to the system 400. FIG. 4C is a timing diagram showing split transaction accesses to the peripheral devices according to an embodiment.

Referring to FIG. 4A, a system 400 can include a host device (e.g., host MCU) 402, a first (peripheral) device 406-0, and a second (peripheral) device 406-1. Devices 406-0/1 can be memory devices having a same or similar latency, and in the embodiment shown are NOR flash memory devices. A host device 402 can be connected to peripheral devices 406-0/1 by a serial bus 408 and can provide a serial clock SCK to devices 406-0/1. A host device 402 can select a first device 406-0 via a first select signal CS0 # and a second device 406-1 via a second select signal CS1 #.

Referring to FIG. 4B, in a conventional operation, prior to time t0, controller device 402 can select a first device 406-0 by driving select signal CS0 # low. Second device 406-1 can remain unselected as signal CS1 # is high.

At time t0, a host device 402 can execute a first conventional read transaction 407-0 to the first device 406-0. The first read transaction 407-0 can include a first (conventional) read instruction 419-0 and address 422 output on serial bus QIO in synchronism with SCK. In response, a first device 406-0 can execute a read operation to the address indicated by the first read transaction 407-0 in a synchronous fashion.

At time t2, following the completion of address 422, a number of dummy cycles 421 can follow corresponding to a latency of the first device 406-0.

At time t3, first device can complete the read operation and place read data 426 on QIO. It is noted that up to this time, host device 402 has continued to assert CS0 #, selecting the first device 406-0.

At time t4, host device 402 can drive CS0 # high, deselecting first device 406-0.

At time t5, controller device 402 can select a second device 406-1 by driving select signal CS1 # low. A host device 402 can then execute a second (conventional) read transaction 407-1 to the second device 406-1. The second read transaction 407-1 can take the same general form as the first read transaction 407-0 and can result in second device 406-1 providing read data on QIO following another series of dummy cycles 421 (as the latencies of the devices 406-0/1 is the same or similar).

FIG. 4C shows a split read transaction according to embodiments. In the split read transaction, an idle time on a serial bus during a latency period can be made available to pipeline transactions to other devices on the same SPI bus (or different locations on the same device).

Referring to FIG. 4C, prior to time t0, controller device 402 can select a first device 406-0 by driving select signal CS0 # low. Second device 406-1 can remain unselected as signal CS1 # is high.

At time t0, a host device 402 can initiate a first split (read) transaction 428-0 to the first device 406-0. The first split transaction 428-0 can include a first split read instruction 420-0 and address 422 (at time t1) output on serial bus QIO in synchronism with SCK. In response, a first device 406-0 can start to execute a read operation to the address indicated by the first split transaction 428-0.

At time t2, following the completion of address 422, host device 402 can drive CS0 # high, deselecting first device 406-0. In addition, SCK can be disabled. However, in other embodiments SCK can remain active.

At time t3, controller device 402 can select a second device 406-1 by driving select signal CS1 # low. A host device 402 can then initiate a second split (read) transaction 428-1 to the second device 406-1. Initiating the second split transaction can take the same general form as the initiation of the first split transaction 428-0.

In this way, while a first device 406-0 is launching a read transaction, the serial bus QIO can be returned to the idle state allowing second device 406-1 to launch its own independent read transaction.

At time t5, after initiating the second split transaction 428-1, host device 402 can deselect the second device 406-1 by driving CS1 # high. In addition, SCK can be disabled and QIO can go idle.

Between times t5 and t6 (i.e., a remainder of the latency period), select signals CS0/1 # and SCK can remain inactive. However, in other embodiments SCK can remain active.

At time t6, a host device 402 can select a first device 406-0 by driving CS0 # low and restarting SCK. The host device 402 can then complete the first split transaction 430-0. Completing the first transaction 430-0 can include the host device 402 issuing a first complete instruction 424-0 on QIO. In response, first device 406-0 can output read data 426 on QIO at time t7.

At time t8, following read data 426 from first device 406-0, host device 402 can drive CS0 # high, deselecting first device 406-0 and SCK can be disabled.

At time t9, a host device 402 can select a second device 406-1 by driving CS1 # low and restarting SCK. The host device 402 can then complete the second split transaction 430-1. Completing the second transaction 430-1 can include the same general actions as completing the first transaction 430-0, including an instruction 424-1 from the host device 402 and the second device 406-1 responding with read data 426.

It is noted that the second legacy read operation (407-1 in FIG. 4B) has barely started by the time the second (pipelined) operation (430-1) has completed retrieving its target data.

FIGS. 5A to 5C are diagrams showing a system that can pipeline split transactions for target destinations having different latencies. FIG. 5A is a block diagram of a system 500. FIG. 5B is a timing diagram showing the same conventional accesses as FIG. 4B. FIG. 5C is a timing diagram showing accesses with split transactions to devices with different latencies according to an embodiment.

Referring to FIG. 5A, a system 500 can include a host device (e.g., host MCU) 502, a first (peripheral) device 506-0, and a second (peripheral) device 506-1. Devices 506-0/1 can both be memory devices, with first device 506-0 having a greater access latency than second device 506-1. In the embodiment shown, first device 506-0 can be a NOR flash memory device, while second device 506-1 can be a pseudo-static random access memory (PSRAM). A host device 502 can be connected to peripheral devices 506-0/1 in the same manner as FIG. 4A.

FIG. 5B shows the same accesses as FIG. 4B. Thus, the conventional transaction at time t5 is directed to second device 506-1 and will result in second device 506-1 returning read data on QIO after a latency period (which can be shorter than that for the first device 506-0).

Referring to FIG. 5C, as in the case of FIG. 4C, an idle time on a serial bus during a latency period can be made available to pipeline transactions to other devices/device locations. However, due to the differences in latency, transactions to a faster device can be completed during the latency time of the slower device.

At times t0 to t5, a host device 502 can initiate two transactions 528-0/1 in a pipelined fashion in the same manner as FIG. 4C. However, unlike FIG. 4C, because second device 530-1 has a faster access time, at time t6 a host device 502 can complete the second transaction 530-1 prior to completing the first transaction 530-0.

At time t9, the host device 502 can complete the first transaction 530-0 in the same manner as FIG. 4C.

It is noted that the first and second transactions are completed (530-0/1) prior to the second legacy read operation (507-1 in FIG. 5B) starting. While FIG. 5C shows SCK being deactivated during the latency period and between transaction parts, in other embodiments SCK can remain active.

FIGS. 6A to 6C are diagrams showing a system that can pipeline split transactions for different target destinations of the same device. FIG. 6A is a block diagram of a system 600. FIG. 6B is a timing diagram showing the same conventional accesses as FIG. 4B. FIG. 6C is a timing diagram showing accesses with split transactions to different parts of a same device.

Referring to FIG. 6A, a system 600 can include a host device (e.g., host MCU) 602 and a peripheral device 604 having a first region (or function) 606-0 and a second region (or function) 606-1. In the embodiment shown, the peripheral device 604 can be memory device, and regions/functions 606-0/1 can be different banks. A host device 602 can be connected to the peripheral device 604 by a serial bus 608 and can provide a serial clock SCK to the peripheral device 604. A host device 602 can select a first bank 606-0 via a first select signal CS0 # and a second bank 606-1 via a second select signal CS1 #. However, in alternate embodiments, different banks could be selected with address values transmitted on serial bus 608 during the initiation of a transaction.

FIG. 6B shows the read accesses like those of FIG. 4B, but with accesses being to different banks 606-0/1 rather than different devices. Thus, at time t0, the host device 602 can execute a conventional read transaction 607-0 to a first bank 606-0 of peripheral device 604. At time t3, following the dummy cycles 621 of a latency period, the host device 602 can execute a second conventional read transaction 607-1 to a second bank 606-1 of peripheral device 604. Following another set of dummy cycles, peripheral device 604 can output read data from the second bank 606-1.

Referring to FIG. 6C, as in the case of FIG. 4C, an idle time on a serial bus during a latency period can be made available to pipeline transactions. However, the pipelined transactions are to different locations of the same device.

At times t0 to t5, a host device 602 can initiate two transactions 628-0/1 in a pipelined fashion in the same manner as FIG. 4C. However, a first initiated transaction 628-0 is to a first bank 606-0, while a second initiated transaction 628-1 is to a second bank 606-1. Further, host device 602 can select a bank 606-0/1 by activating a corresponding select signal CS0 #/CS1 #. However, as noted above, in alternate embodiments, a bank can be indicated by address values (e.g., 622).

At time t6, the host device 602 can complete the first transaction 630-0. Host device 602 can select the first bank 606-0 by activating CS0 # (or sending a bank address), can activate SCK, and then issue a completion indication/instruction 624-0. In response, read data 626 from the first bank 606-0 can be output on QIO.

At time t8, the first bank 606-0 can be then be deselected by deactivating CS0 # (or timing out after data has been output). SCK can also be deactivated.

At time t9, the host device 602 can complete the second transaction 630-1. Completion of the second transaction 630-1 can occur in the same general fashion as completion of the first transaction 630-0, but with peripheral device 604 providing read data from the second bank 606-1.

As in the case of FIG. 4C, the second legacy read operation (607-1 in FIG. 6B) has barely started by the time the second (pipelined) operation (630-1) has completed retrieving its target data. While FIG. 6C shows SCK being deactivated during the latency period and between transaction parts, in other embodiments SCK can remain active.

Figure 7A:
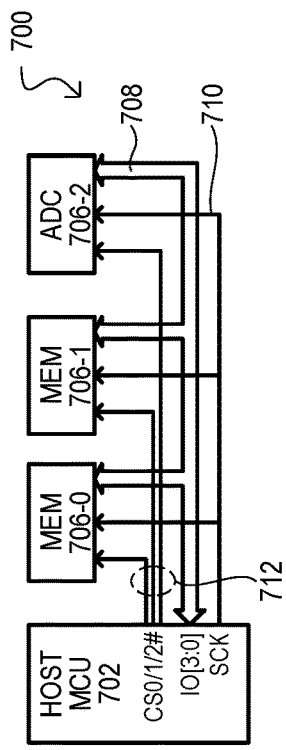
FIGS. 7A and 7B are diagrams showing a system executing split transactions with peripheral devices of different types, according to embodiments.
Figure 7B:
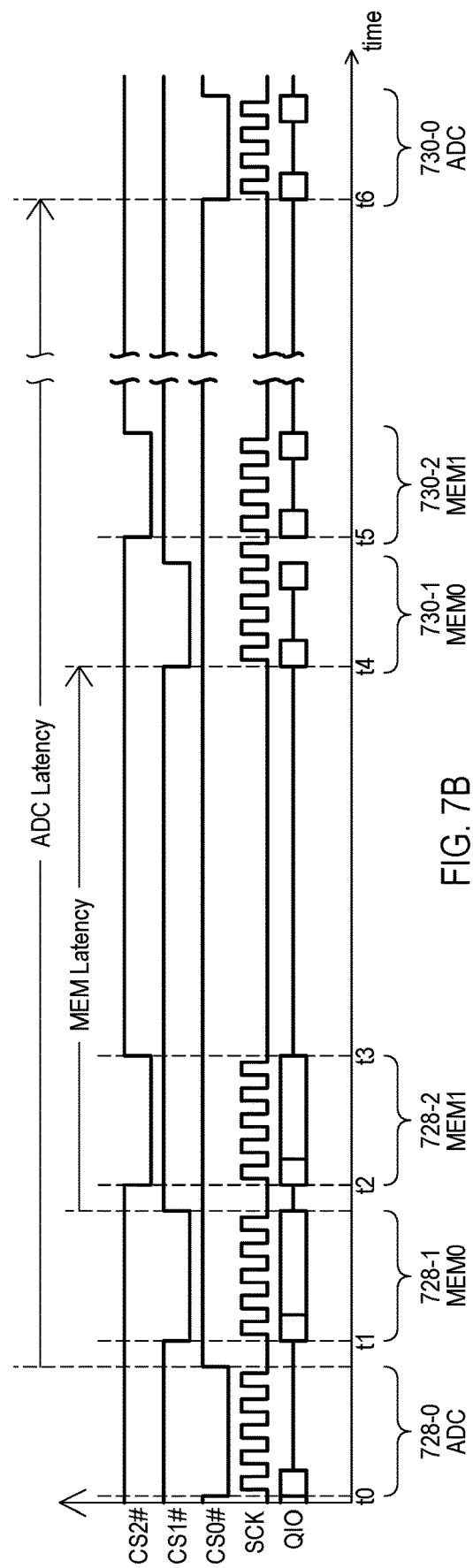

FIGS. 7A and 7B are diagrams showing a system that can pipeline split transactions for devices of different types. FIG. 7A is a block diagram of a system 700 and FIG. 7B is a timing diagram showing accesses with split transactions to devices of different types according to an embodiment.

Referring to FIG. 7A, a system 700 can include a host device (e.g., host MCU) 702 and a first peripheral device 706-0, second peripheral device 706-1, and third peripheral device 706-2. In the embodiment shown, the first and second peripheral devices 706-0/1 can be memory devices, and third peripheral device 706-2 can be an analog-to-digital converter (ADC). A host device 702 can be connected to the peripheral devices 706-0/1/2 by a serial bus 708 and can provide a serial clock SCK to the peripheral devices 706-0/1/2. A host device 702 can select between the peripheral devices 706-0/1/2 with select signals CS0 #, CS1 # and CS2 #, respectively.

Referring to FIG. 7B, at time t0, a host device 702 can initiate a first transaction 728-0 to ADC 706-2. In some embodiments, initiating first transaction 728-0 can include a host device 702 selecting the ADC 706-2 with select signal CS0 # and transmitting an instruction on QIO. Such an instruction may or may not include additional data (e.g., register address).

At times t1 to t3, during a latency period for the operation to ADC 706-2, a host device 702 can initiate second and third transactions 728-1/2 with memory devices 706-0/1, respectively. In the embodiment shown, initiating transactions 728-1/2 can occur in the same fashion as shown in FIG. 4C, including disabling SCK between initiating transactions.

At time t3, following the pipelined initiation of three transactions 728-0/1/2, SCK can be disabled and QIO can be idled.

At times t4 to t5, during the latency period for ADC 706-2, the second and third transactions can be completed 730-1/2. This can include the actions described in FIG. 4C, including the host device eliciting responses from memory devices 706-0/1.

At time t6, following the ADC latency, the first transaction can be completed 730-0. In some embodiments, such an action can include a host device 702 eliciting a response from ADC 706-2, according to any of the approaches described herein, or an equivalent. While FIG. 7B shows SCK being deactivated during the latency period and between transaction parts, in other embodiments SCK can remain active.

Figure 8A:
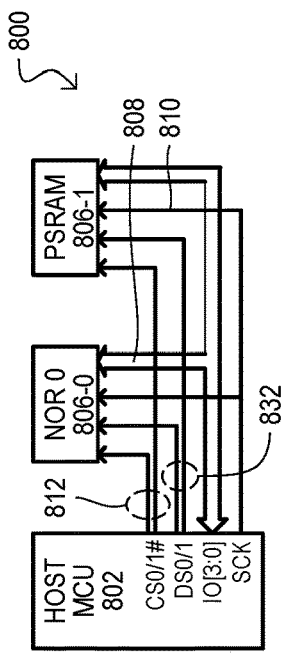
FIGS. 8A and 8B are diagrams showing a system executing split transactions that are completed with non-serial bus signals, according to embodiments.
Figure 8B:
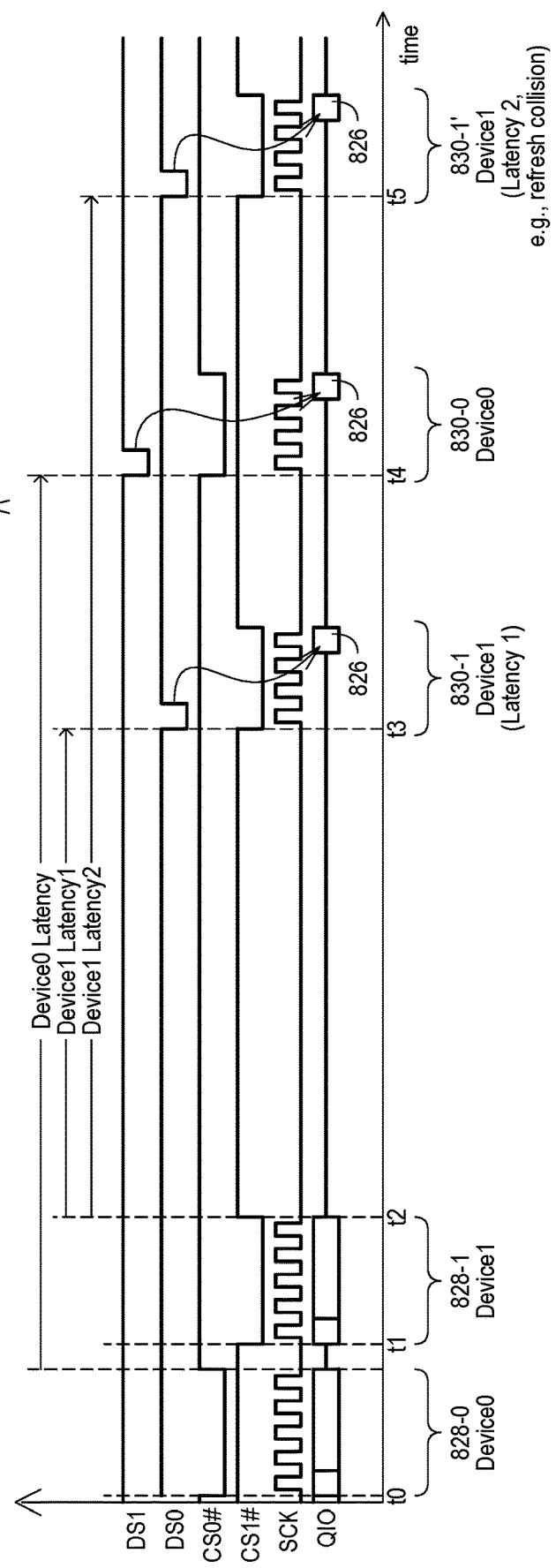

FIGS. 8A and 8B are diagrams showing a system in which a host device can elicit completion of split transactions with a signal that is not part of the serial bus, as well as a system in which a peripheral device can have a variable latency. A device with a variable latency may have a different latency depending upon its operating condition. As but one of many possible examples, a DRAM based memory may have an increased latency in the event an access is to memory cells that are being refreshed (i.e., a refresh collision). FIG. 8A is a block diagram of a system 800. FIG. 8B is a timing diagram showing accesses with split transactions.

Referring to FIG. 8A, a system 800 can include a host device (e.g., host MCU) 802, a first (peripheral) device 806-0, and a second (peripheral) device 806-1. Devices 806-0/1 can both be memory devices, and in the embodiment shown, device 806-0 can be a NOR flash memory device and device 806-1 can be a PSRAM device. A host device 802 can be connected to peripheral devices 806-0/1 in the same manner as FIG. 4A. However, in addition, a host device 802 can be connected to each peripheral device 806-0/1 by non-bus signals 832, which can be data strobe (DS) signals in the embodiment shown.

Referring to FIG. 8B, at times t0 to t2, a host device 802 can initiate two transactions 828-0/1 in a pipelined fashion in the same manner as FIG. 5C.

At time t3, after a first possible latency, a host device 802 or peripheral device 806-1 can complete the second transaction 830-1. However, unlike FIG. 5C, a peripheral device or a host device 802 can elicit completion of the second transaction 830-1 by operation of non-serial bus signal DS1. In response to DS0 being activated (going low in this example), PSRAM device 806-1 can output read data 826.

At time t4, a host device 802 can complete the first transaction 830-0 by activating DS0. In response, NOR device 806-1 can output read data 826.

As noted, a second device 806-1 can have a variable latency. In the embodiment shown, PSRAM can have an increased latency in the event of a refresh collision. This second latency case is shown at time t5. At time t5, after a second possible latency, a host device 802 or peripheral device 806-1 can complete the second transaction 830-1 in the manner shown for time t3.

While FIG. 8B shows SCK being deactivated during the latency period and between transaction parts, in other embodiments SCK can remain active.

Figure 9A:
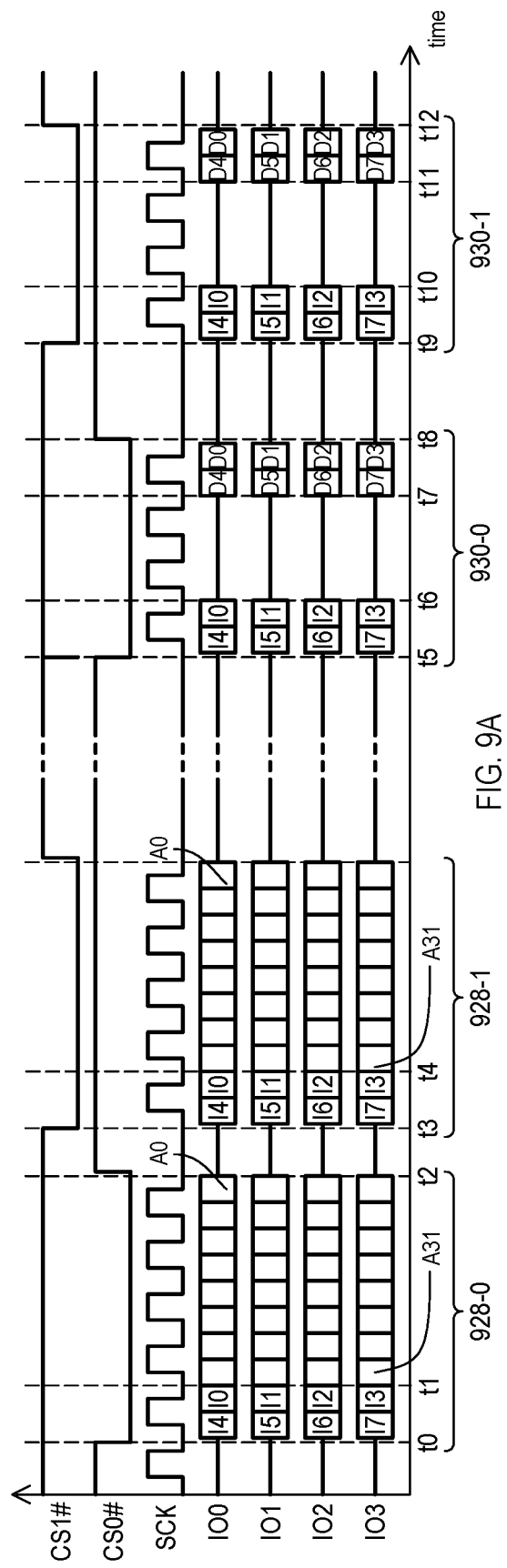
FIGS. 9A and 9B are timing diagrams showing split transactions on different serial bus types, according to embodiments.
Figure 9B:
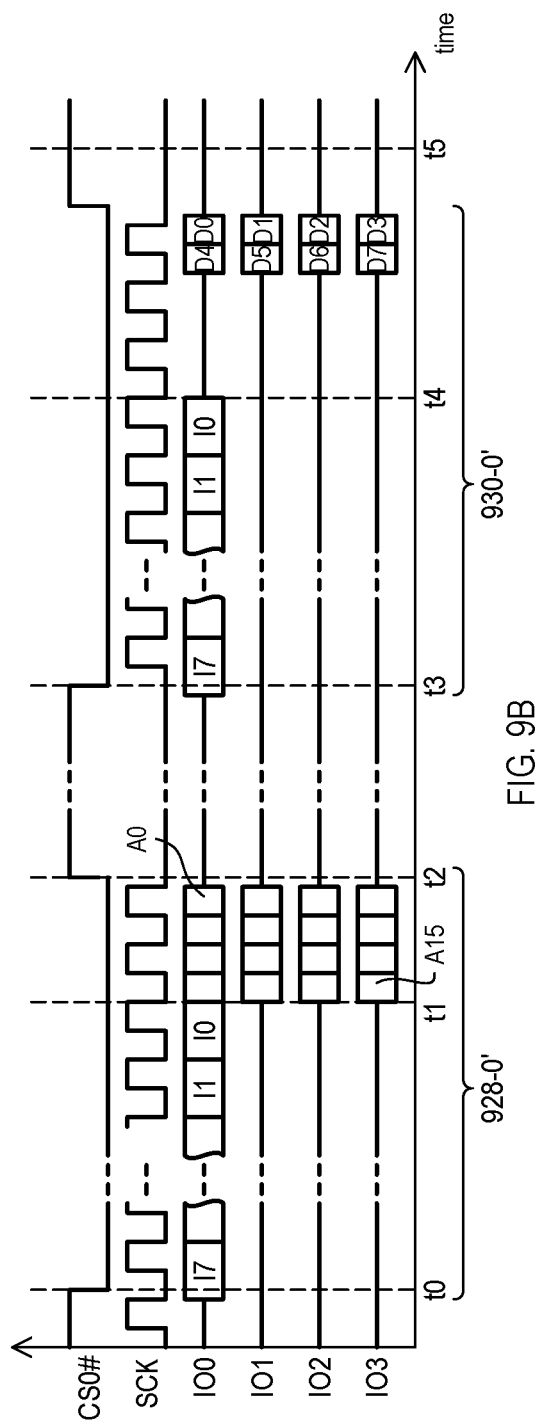

Embodiments can initiate and complete instructions on a serial bus in synchronism with a serial clock signal. Such synchronous operations can take any suitable form, including single data rate (SDR), where data values are synchronous with only rising (or only falling) edges of a serial clock, and double data rate (DDR), where data values are synchronous with both rising and falling edges of the serial clock, and combinations thereof. FIGS. 9A and 9B show two implementation of numerous possible serial bus timings according to embodiments. FIGS. 9A and 9B include waveforms for select signals CS0 #, CS1 #, a clock signal SCK, and quad IO serial bus (IO0-IO3). However, a serial bus could include fewer or greater than four I/Os.

FIG. 9A is a timing diagram showing "full" double data rate transactions according to an embodiment. At time t0, a first transaction can be initiated 928-0 by a host device. This can include, at time t0, CS0 # being active, and an 8-bit instruction [I7:I0] being driven on the IOs as two four-bit values on rising and falling edges of SCK. This can be followed at time t1 with a 32-bit [A31:A0] address sent as eight four-bit values on rising and falling edges of SCK. Of course, a number of address bits can vary according to the number of addresses of a target device. At time t2, CS0 # can return high and SCK can be disabled.

At time t3, a second transaction can be initiated 928-1. The initiation of the second transaction 928-1 can occur in the same fashion as that of the first transaction 928-0. However, a second device is selected by activating CS1 #.

Following a latency period, at time t5, a first transaction can be completed 930-0. This can include, at time t5, CS0 # being active, and another 8-bit instruction [I7:I0] being driven on IOs. Such an instruction can elicit a response from the target device. In the embodiment shown, two clock cycles can be dedicated for a bus turnaround time. At time t7, a peripheral device can output data to complete the first transaction. In the embodiment shown, the peripheral device can output an 8-bit value [D7:D0] as two four-bit values on rising and falling edges of SCK. Of course, larger output data values can occupy more SCK cycles.

At time t9, the second transaction can be completed 930-1. This can occur in the same fashion as that of the first transaction 930-0. However, a second device is selected by activating CS1 #.

FIG. 9B is a timing diagram showing DDR transactions with SDR commands. At time t0, a first transaction can be initiated 928-0' by a host device. CS0 # can be activated, and an 8-bit instruction [I7:I0] can be driven on IO0 as one-bit values on rising edges of SCK. This can be followed at time t1 with a 16-bit [A15:A0] address sent as four four-bit values on rising and falling edges of SCK. Again, a number of address bits can vary according to the number of addresses of a target device. At time t2, CS0 # can return high and SCK can be disabled.

It is noted that additional transactions can be initiated after time t2 in a pipelined fashion as described herein, or equivalents.

At time t3, following a latency period, the first transaction can be completed 930-0'. This can include, CS0 # being active, and another 8-bit instruction [I7:I0] being driven on IO0 at a SDR rate. In response, at time t4, a peripheral device can output data to complete the first transaction. In the embodiment shown, the peripheral device can output an 8-bit value [D7:D0] as two four-bit values on rising and falling edges of SCK.

While FIGS. 9A and 9B show SCK being deactivated during the latency period and between transaction parts, in other embodiments SCK can remain active.

According to embodiments, a host (e.g., controller) device can be connected to a serial bus and can receive parameter data from peripheral devices connected to the serial bus. The parameter data can indicate if a peripheral device is capable of processing split transactions. The controller device can then issue split transactions commands to compatible peripheral devices, including pipelined commands issued within a latency period (e.g., during a dummy cycle time) of a previous command.

Figure 10A:
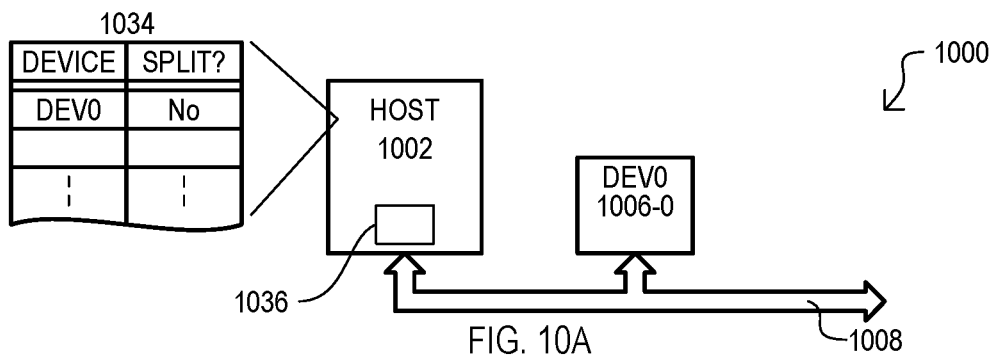
FIGS. 10A to 10C are diagrams showing a system that determines split transaction capabilities of attached peripheral devices, according to an embodiment.
Figure 10B:
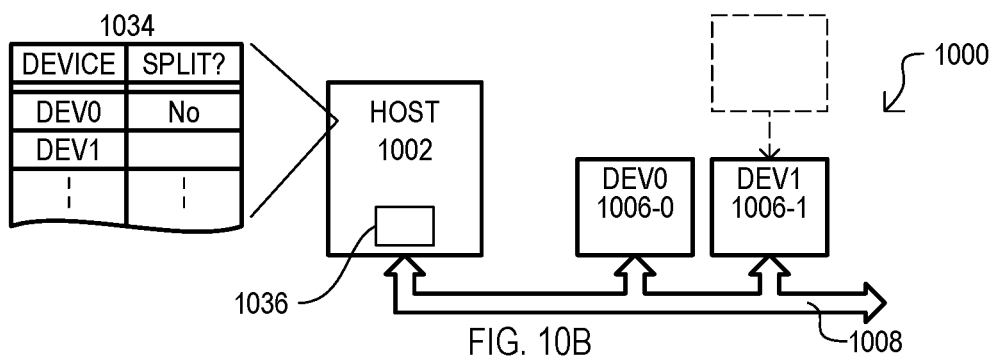
Figure 10C:
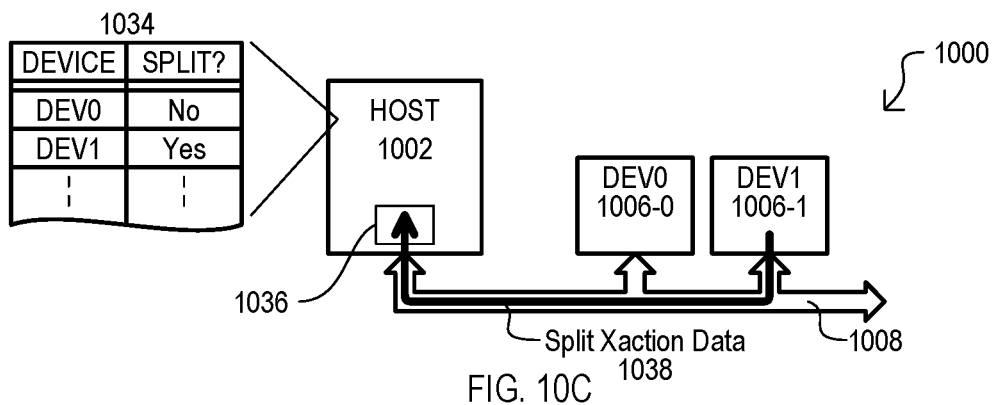

FIGS. 10A to 10C are a series of diagrams showing a system 1000 and operations according to an embodiment. A system 1000 can include a host device 1002 connected to a serial bus 1008. A host device 1002 can include a parameter store 1034 and a parameter detector 1036. A parameter store 1024 can store parameter values for peripheral devices (DEVICE) connected to a serial bus 1008, including whether a peripheral device is compatible with split transactions (SPLIT?). Host device 1002 can include a parameter detector process 1036, which can receive and/or request parameter information from peripheral devices detected on the serial bus 1008.

FIG. 10A shows a system 1000 having a first peripheral device 1006-0 connected to serial bus 1008. As shown by parameter store 1034, controller device 1002 has detected a first (peripheral) device 1006-0 (shown as DEV0). Further, by operation of parameter detector process 1036, first device 1006-0 has been previously determined not to be capable of executing split transactions (shown as "No").

FIG. 10B shows a system 1000 as a second (peripheral) device 1006-1 is connected to the serial bus. The second device 1006-1 is detected by the host device 1002, represented by "DEV1" appearing in parameter store 1034.

FIG. 10C shows a system 1000 as parameter detector process 1036 determines that the second device 1006-1 can execute split transactions. As shown by parameter store 1034, second peripheral device (DEV1) 1006-1 has been determined to be capable of executing execute split transactions, represented by "Yes" appearing in parameter store 1034. In the embodiment shown, split transaction data 1038 can be transmitted from second device 1006-1 to host device 1002. In some embodiments, this can include host device 1002 requesting such data from the second peripheral device 1006-1.

FIGS. 11A to 11C are diagrams of split transaction commands according to embodiments. Such commands can be issued as instructions by a controller (e.g., host) device and executed by a peripheral device as described herein. FIGS. 11A to 11C show tables having the following columns: "Instruction" gives a shorthand name for the instruction; "Description" is a brief description of the command; and "Code(Hex)" indicates the command can be issued as an eight-bit value. Code values shown as "XX" are values that can take any available code not used by other instructions of an existing standard. In some embodiments, values "XX" can be supplemental instructions to an SPI standard. However, it is understood the embodiments of FIGS. 11A to 11C are exemplary, and such commands can have any suitable bit size for a given system and bus protocol.

FIG. 11A shows a command set in which a controller device can have separate commands for completing various transactions. A split read operation can be initiated by a "SPLIT_READ_INI" instruction then subsequently completed by a "SPLIT_READ_CMP" instruction. A split write operation can be executed in the same fashion: "SPLIT_WRITE_INI" and "SPLIT_WRITE_CMP" instructions.

FIG. 11B shows a command set in which a controller device can have one command for completing various transactions. A split read and write operations can be initiated by a "SPLIT_READ" and "SPLIT_WRITE" instructions. Subsequently, such initiated transactions can be completed by a "RDSR2" (e.g., read status register) instruction. In some embodiments, the RDSR2 instruction can be accompanied by a value indicating the transaction to be completed. In the embodiment shown, such a command can be an existing command of an SPI protocol.

FIG. 11C shows a command by which a controller device can elicit parameter data from a peripheral device, including if the peripheral device can execute split transactions. In the embodiment shown, such a command can be an existing command of an SPI protocol.

While embodiments can include any suitable peripheral device configured to execute split transactions, such a capability can greatly benefit nonvolatile memory devices, such as flash NOR memories, that include access latencies and where minimal pin count is desirable due to the application in which the devices are employed. One such embodiment is shown in FIG. 12.

FIG. 12 is a block diagram of a memory device 1206 according to an embodiment. A memory device 1206 can receive a serial clock (SCK) 1210 and be connected to a serial bus 1208. In the embodiment shown, a serial bus 1208 can include multiple serial input/outputs (I/Os). A serial bus 1208 can include one or more lines on which all of command, address and data are transmitted.

A memory device 1206 can include a clock circuit 1240, I/O interface (I/F) 1244, an input store (e.g., buffer) 1246, and output store (e.g., buffer) 1248, one or more nonvolatile memory arrays 1250, read/write circuits 1252, control circuits 1254, and a parameter store 1256. An I/O I/F 1244 can receive and transmit data over bus 1208 in synchronism with SCK. In the embodiment shown, data on serial bus 1208 received by I/O I/F 1244 (which can include instructions, address and associated data) can be stored in input buffer 1246. Data for transmission on serial bus 1208 by I/O I/F 1244 can be received from output buffer 1248.

A nonvolatile array(s) 1250 can include one or more arrays of nonvolatile memory cells, including NOR flash arrays. In some embodiments, nonvolatile array(s) can include multiple banks, which are separately accessible, enabling pipelined split bank access transactions, such as those shown in FIGS. 6A to 6C, or an equivalent. Read/write circuits 1252, can include circuits for accessing data stored in nonvolatile array(s), and can include decoder circuits, sense amplifier circuits, program circuits, erase circuits, and the like.

Control circuits 1254 can include logic circuits for controlling various functions of the memory device 1206. Control circuits 1254 can include various sections and/or functions, including but not limited to: I/O control 1254-0, instruction detect (e.g., decode) 1254-1, and read/write control 1254-2. I/O control 1254-0 can control I/O I/F 1244, including transmitting response data to complete transactions within a predetermined time, or according to a predetermined schedule. Instruction detect 1254-1 can detect various instructions received from a host device, including split transaction instructions 1258-2.

Read/write control 1254-2 can generate signals for controlling read/write circuits 1252, including the execution of split transactions. In some embodiments, read/write control circuits 1254-2 can switch between a conventional mode and a split transaction mode. In a conventional mode, operations can be synchronous with SCK, being completed within a predetermined latency time. In a split transaction mode, operations can be asynchronous, being initiated by an input from a controller device, and then completed by another input from the controller device. Possible operations of read write control circuits according to embodiments are shown as 1258-0/1.

Operation 1258-0 shows a split read operation. In response to instruction detect 1254-1 detecting an initiate split read instruction, read/write control 1254-2 can access nonvolatile array(s) 1250. Such an action can include enabling decoder circuits in response to a received address to access memory cells storing read data, and activating sense amplifiers to output read data. Such read data can be output from nonvolatile array(s) 1250 and stored in output buffer 1248. However, unlike a conventional read command, such read data is not automatically output at a predetermined latency. Rather, the read data remains in the output buffer 1248. In response to instruction detect 1254-1 receiving a complete split read instruction, read/write control 1254-2 can enable the read data to be output on serial bus 1208 from output buffer 1248 by operation of I/O I/F 1244.

Operation 1258-1 shows a split write operation. In response to instruction detect 1254-1 receiving an initiate split write instruction, read/write control 1254-2 can store write data within input buffer 1246. Unlike a conventional write command, write data is not automatically written into nonvolatile array(s) 1250. In response to instruction detect 1254-1 receiving a complete split write instruction, read/write control 1254-2 can access nonvolatile array(s) 1250 and store the write data. Such an action can include activating decoder circuits in response to a received address, and activating programming circuits and/or algorithms to store the write data in targeted memory cells.

A parameter store 1256 can store operating parameters of the memory device 1206. Such parameters can include conventional parameters, but can also include split transaction parameters. Split transactions parameters can include, but are not limited to: one or more values indicating the memory device 1206 can execute split transactions, one or more values indicating the type(s) of split transactions that are compatible with the memory device 1206, and latency periods for types of transactions. A parameter store 1256 can include nonvolatile memory circuits, and in some embodiments can be one or more addressable registers.

In some embodiments, a memory device 1206 can be implemented as a single integrated circuit.

Figure 13:
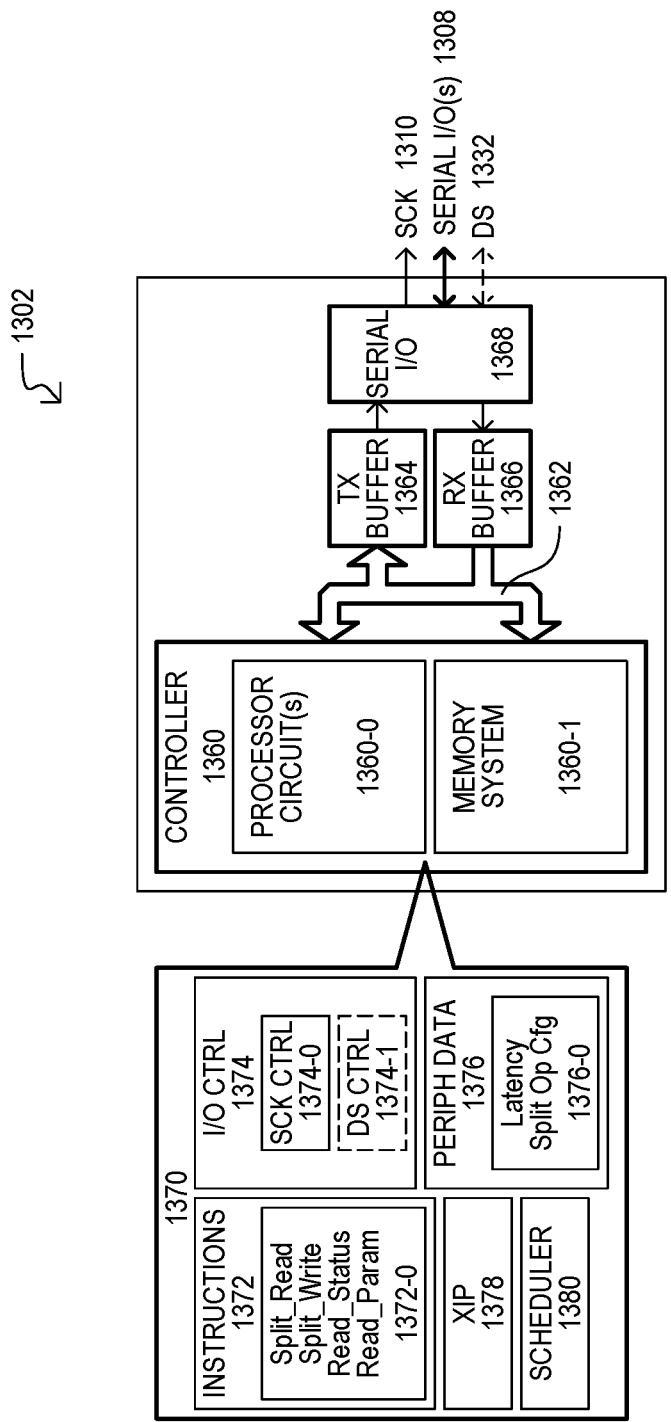
FIG. 13 is a block diagram of a controller device according to an embodiment.

FIG. 13 is a block diagram of a host device 1302 according to an embodiment. A host device 1302 can include a controller section 1360, a bus/backplane system 1362, a transmit buffer 1364, a receive buffer 1366, and an I/O circuit 1368. A controller section 1360 can be connected to transmit/receive buffers 1364/1366 by bus/backplane system 1362. Transmit buffer 1364 can store data for output on a serial bus 1308 by I/O circuit 1368. Receive buffer 1366 can store values received on serial bus 1308 by I/O circuit 1368.

I/O circuit 1368 can be configured to generate and output a serial clock (SCK) 1310 and transmit and receive data on serial bus 1308 in synchronism with SCK. A serial bus 1308 can include one or more serial input/outputs (I/Os), including at least one I/O on which all of command, address and data are transmitted. In some embodiments, I/O circuit 1368 can also control a non-serial bus signal (shown as DS) that can be used to signal the completion of split transactions, as shown in FIGS. 8A/B, or an equivalent operation.

A controller section 1360 can include processor circuits 1360-0 and a memory system 1360-1. In some embodiments, processor circuits 1360-0 can execute instructions stored in memory system 1360-1 to provide various host (e.g., controller) device functions described herein, and equivalents. Processor circuits 1360-0 can include one or more processors connected to memory system 1360-1. A memory system 1360-1 can include any suitable memory circuits, including volatile memory nonvolatile memory, or a combination thereof.

Various functions executable by a controller section 1360 are shown as 1370. Functions can include a set of instructions 1372 executable by peripheral devices on the serial bus 1308. Instructions 1372 can include split transaction instructions 1372-0. In the embodiments shown, such instructions can include split read instructions (Split_Read) and split write instructions (Split_Write). Such instructions can take the form of any of those described herein or equivalents. Such instructions can be to locations of any suitable type, including but not limited to: memory device locations and register locations. Split read and write instructions can include instruction pairs (one to initiate a transaction, one to complete the transaction), or single instructions for embodiments that use a single instruction (e.g., Read_Status) or that use a non-serial bus signal to complete transactions. Split transaction instructions can also include instructions for querying peripheral devices to determine if they are capable of split transactions (e.g., Read_Param).

Host device functions 1370 can also include I/O control 1374 functions. In some embodiments, I/O control 1374 can include serial clock control 1374-0, including disabling the serial clock (SCK) between split transaction instructions and during latency periods of transactions. Optionally, in cases where a host device can complete split transactions with a non-serial bus signal (e.g., DS), I/O control 1374 can activate such a non-serial bus signal to complete split transactions. Host device functions 1370 can include storing peripheral parameter data 1376. Such parameter data 1376 can include latency values (Latency) for operations that can enable a host to schedule the completion of transactions. Further, such data can include configuration data for peripheral devices regarding split transaction capabilities (Split Op Cfg).

Host device functions can also include an execute-in-place (XiP) function 1378 and a scheduler 1380. XiP functions 1378 can include accessing instructions from a peripheral memory device over serial bus 1306 with split transaction read operations. Such instructions can be executed by processor circuits 1360-0 without being stored in another memory (e.g., volatile memory). A scheduler 1380 can examine a queue of commands to be issued by host device 1302 and order them according to predetermined criteria. Scheduling methods and criteria can vary according to application.

Figure 14:
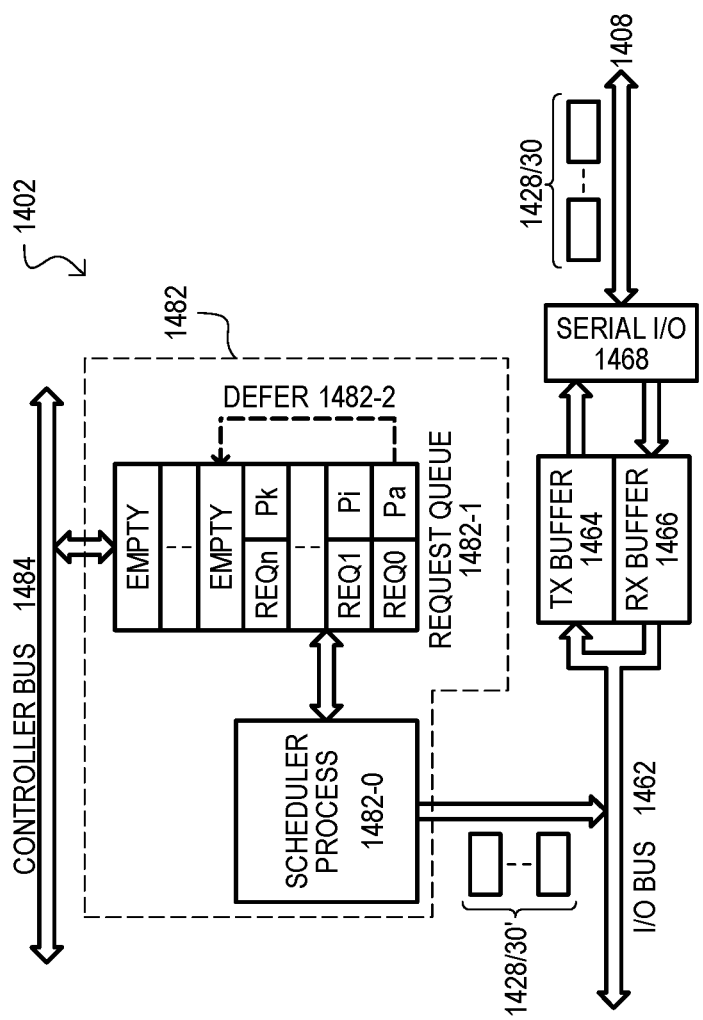
FIG. 14 is a block diagram of a scheduler according to an embodiment.

FIG. 14 is a block diagram showing a scheduler portion 1482 of a host device 1402 according to an embodiment. A scheduler portion 1482 can be connected to a controller bus 1484 and an I/O bus 1462. A scheduler portion 1482 can include a scheduler process 1482-0 and a request queue 1482-1. Requests to access peripheral devices can be received on a controller bus 1484 and stored in request queue 1482-1. Received requests (REQ0 to REQn) can include, or be assigned scheduling criteria (Pa, Pi, Pk). In the embodiment shown, a scheduler process 1482-0 can generate internal commands, including split transaction commands 1428/30', from received requests (REQ0 to REQn). The order in which commands 1428/30' are output can be determined by scheduler process 1482-0 based on scheduling criteria (Pa, Pi, Pk). For example, latency periods can be used to pipeline split transactions as described herein and equivalents.

In some embodiments, a scheduler process 1482-0 can translate requests into split transaction commands. Further, a scheduler process 1482-0 can schedule split transaction command with conventional (e.g., not split) commands.

Commands (1428/30') generated by scheduler portion 1482 can be transferred on I/O bus 1462 to TX buffer 1464, and output as instructions (with other data if appropriate) by serial I/O 1468 on a serial bus 1408 in synchronism with a serial clock (not shown).

Figure 15:
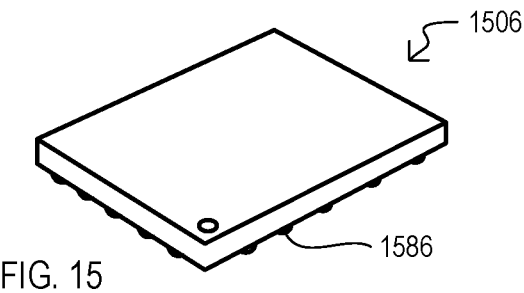
FIG. 15 is a diagram of a memory device according to an embodiment.

As noted herein, embodiments can include memory devices capable of executing split transactions. While such memory devices can include multiple integrated circuits formed in a same package, in some embodiments memory devices can be advantageously compact single integrated circuits (i.e., chips). FIG. 15 shows a packaged single chip memory device 1506. Memory device 1506 can include a limited number of physical I/Os (e.g., pins), one shown as

1586. In some embodiments, physical I/Os 1586 can include no more than four serial I/Os.

Figure 16A:
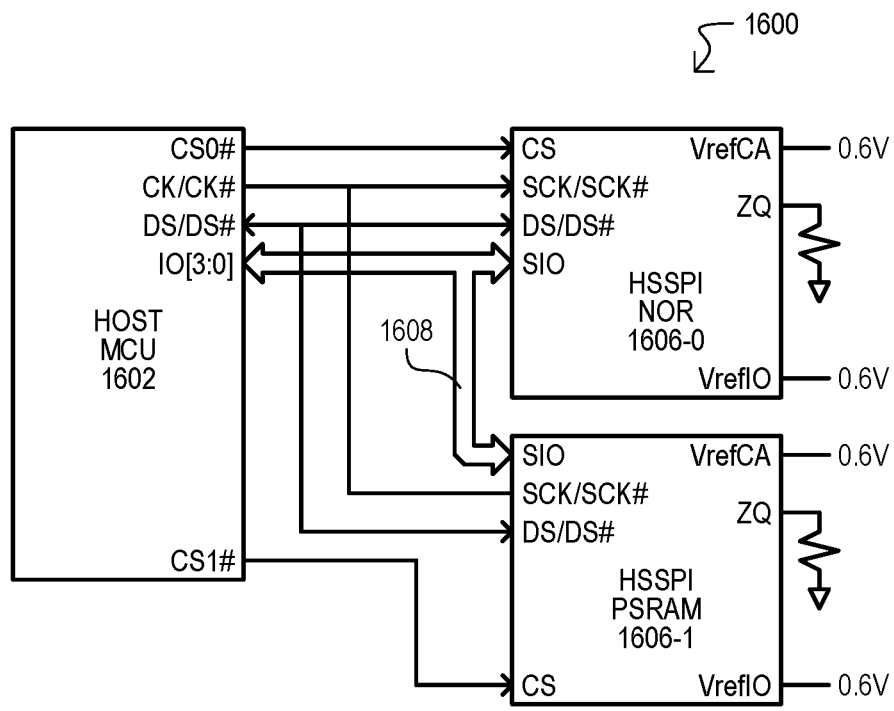
FIGS. 16A and 16B are diagrams showing systems according to embodiments.

FIG. 16A shows a system 1600 according to an embodiment. A system 1600 can include a host device 1602, a first (peripheral) device 1606-0, and a second (peripheral) device 1606-1. A host device 1602 can be connected to peripheral devices 1606-0/1 by a serial bus 1608, and can provide complementary clocks CK/CK # and complementary data strobe signals (DS/DS #) to devices 1606-0/1. A host device 1602 can select a first device 1606-0 via a first select signal CS0 # and a second device 1606-1 via a second select signal CS1 #. In the embodiment shown, a first device 1606-0 can be a NOR type flash device and a second device 1606-1 can be a PSRAM memory device.

According to embodiments, a host device 1602, first device 1606-0, and second device 1606-1 can be compatible with a high speed, double data rate standard, operating at clock speeds greater than or equal to 400 MHz. In the embodiment shown, the devices 1602 and 1606-0/1 can have physical interface compatible with a low power DDR2 (LPDDR2) interface. In such an arrangement, I/Os on serial bus 1608 can operate at 1.2 V. In some embodiments, any or all of devices 1602 and 1606-0/1 can include separate power supplies for IOs (VccQ) in addition to regular power supplies (Vcc). First and second devices 1606-0/1 can receive reference voltages (VrefCA and VrefIO). However, it is understood that command, address and data values can all be transmitted over the same serial bus 1608. Further, first and second devices 1606-0/1 can also have a reference termination resistance ZQ.

A system 1600 can execute split transactions as described herein or equivalents. However, in the embodiment shown, complementary clocks can be provided (CK/CK #). In addition, complementary data strobe signals DS/DS # can be used to signal valid data on a serial bus 1608.

Figure 16B:
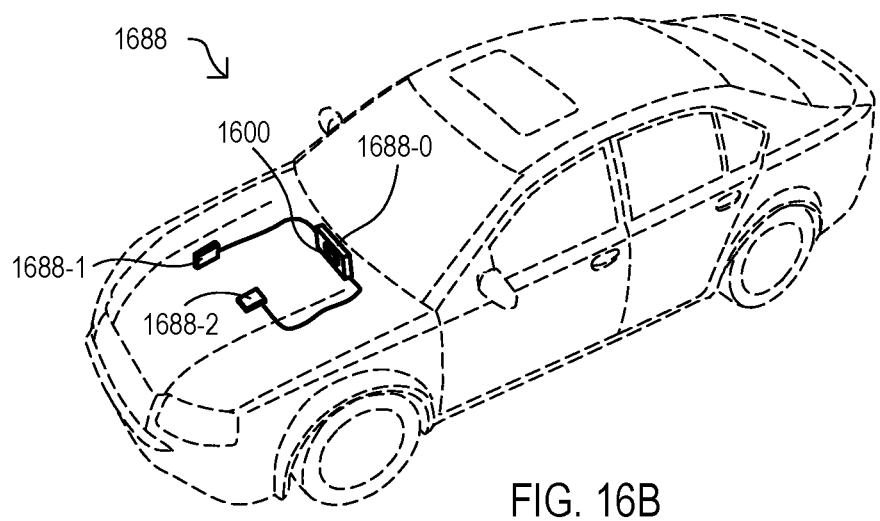

FIG. 16B shows an automobile system 1688 according to an embodiment. An automobile system 1688 can include a control unit 1688-0 and a number of subsystems (two shown as 1688-1/2). A control unit 1688-0 can include a system 1600, like those described herein, including a controller device and one or more peripheral devices connected by a serial bus. Such a system 1600 can execute pipelined split transactions as described herein, including read transactions for execute-in-place operations.

Figure 17:
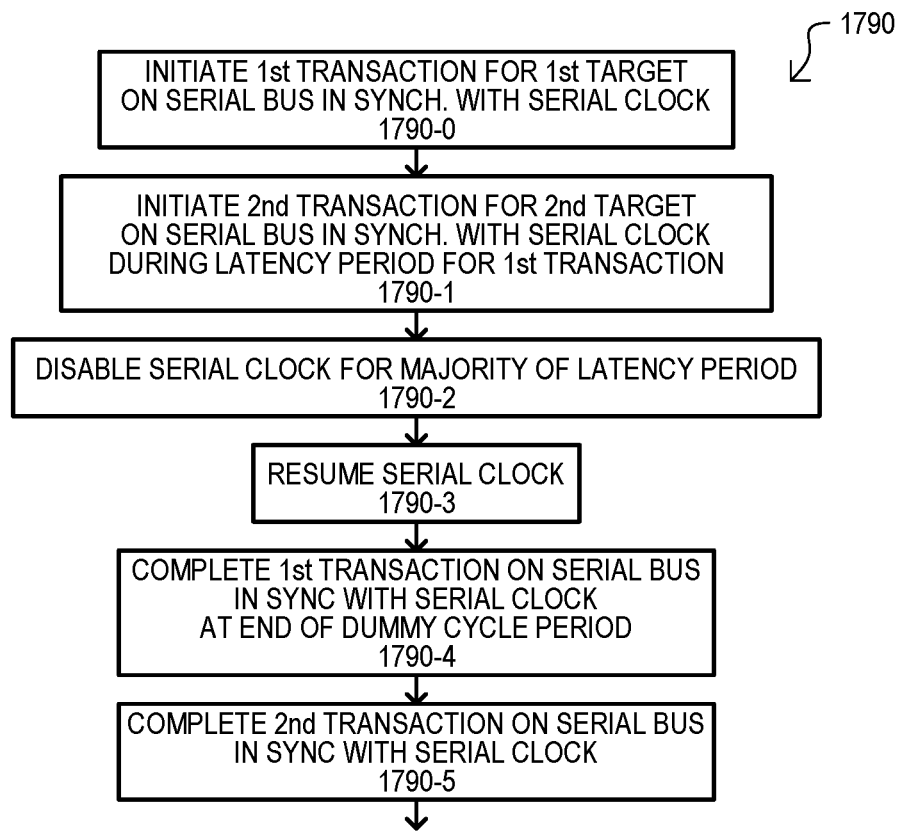
FIG. 17 is a flow diagram of a method for executing split transactions according to embodiments.

While the described devices and systems disclose various methods according to embodiments, additional methods will be described with reference to flow diagrams. FIG. 17 is a flow diagram of a method 1790 according to an embodiment. A method 1700 can include initiating a first transaction for a first target on a serial bus in synchronism with a serial clock 1790-0. Such an action can include a controller device transmitting command and target information over a serial bus. A target can be a peripheral device attached to the serial bus or a portion (e.g., bank) of such a peripheral device.

A second transaction for a second target can be initiated on the serial bus in synchronism with a serial clock, and during a latency period for the first transaction 1790-1. Such an action can include the controller device transmitting command and target information over a serial bus for a different target. The serial clock can be disabled for a majority of the latency period 1790-2. The serial clock can then be resumed 1790-3 to complete initiated transactions.

After and/or with the resumption of the serial clock, the first transaction can be completed on the serial bus in synchronism with a serial clock 1790-4. Such an action can include a first target returning data to the controller device on the serial bus. In some embodiments, such an action can also include a controller device issuing a completion indication to the first target to elicit a response. Such a completion indication can be on the serial bus or separate from the serial bus.

A method 1790 can also include completing the second transaction on the serial bus in synchronism with the serial clock 1790-5. Such an action can occur after or before completion of the first transaction, including during the latency period.

In some embodiments, a method 1790 can executed by a controller (e.g., host) device as described herein or an equivalent.

Figure 18:
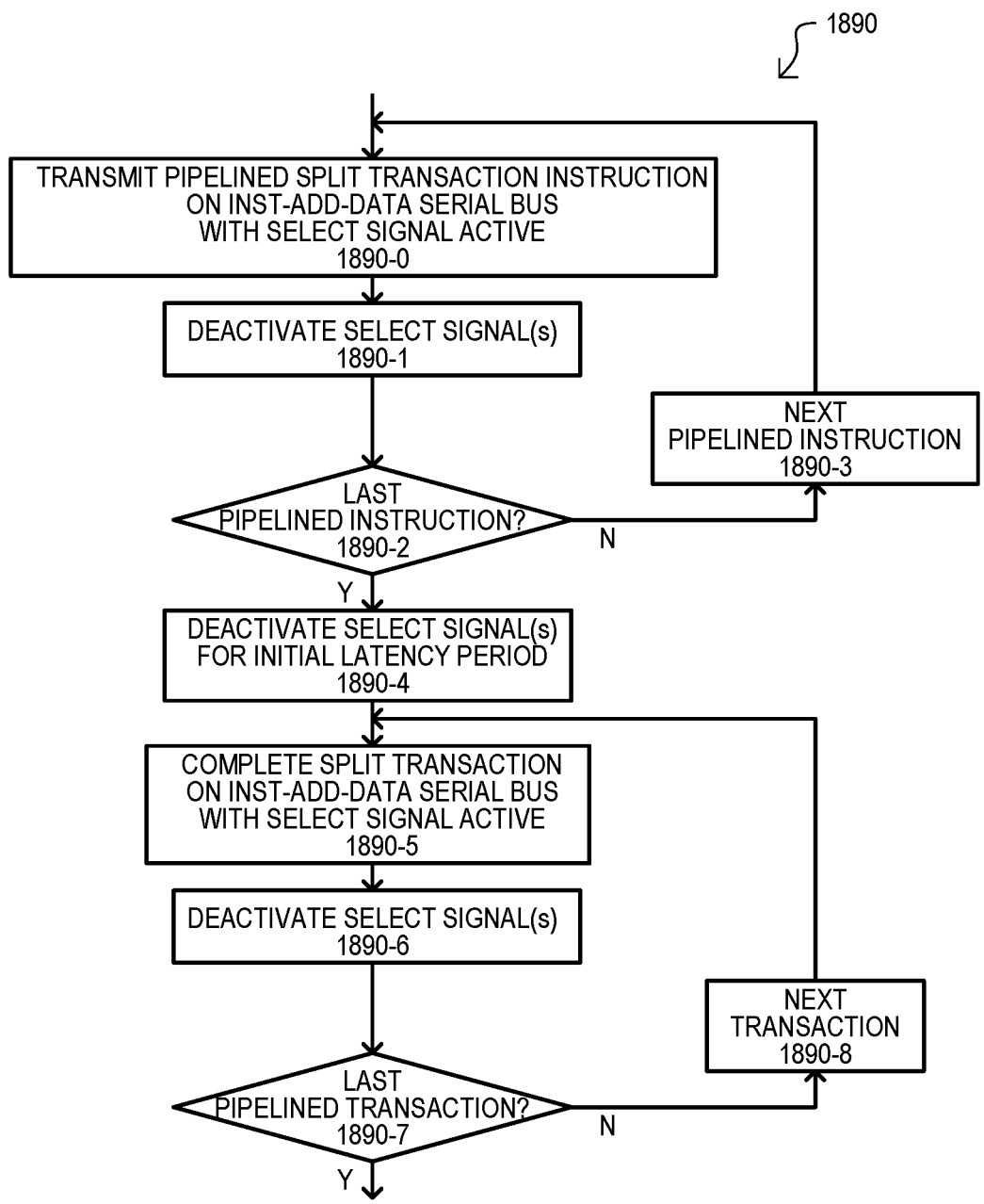
FIG. 18 is a flow diagram of a method for executing pipelined split transactions instructions according to embodiments.

FIG. 18 is a flow diagram of another method 1890 according to another embodiment. A method 1890 can include transmitting a pipelined split transaction instruction on an instruction-address-data serial bus while a select signal is active 1890-0. A pipelined split transaction instruction can be one instruction of a series of instructions that are transmitted one after the other (i.e., without any intervening signals) on a serial bus. Further such pipelined instructions can be split transaction instructions as described herein, or an equivalent. An instruction-address-data serial bus can be serial bus having one or more lines that transmit instruction data, address data and transaction data.

Following the transmission of the split transaction instruction, the select signal(s) can be deactivated 1890-1.

A method 1890 can include determining if an instruction is a last instruction 1890-2. If a last instruction in a set of pipelined instructions has not been initiated (N from 1890-2), a method 1890-3 can go to a next pipelined instruction 1890-3. The next pipelined instruction can have a different select signal than a previous pipelined instruction. If a last instruction in a set of pipelined instructions has not been transmitted (N from 1890-2), a method 1890 can proceed to a next split transaction instruction of the pipelined set of instructions 1890-3.

If a last instruction in a set of pipelined instructions has been transmitted (Y from 1890-2), a select signal can be deactivated for an initial latency period 1890-4. An initial latency period can be a latency period associated with an instruction of the pipelined set. An initial latency period can correspond to any split transaction instruction, and is not limited to the first split transaction instruction of the pipelined set.

A method 1890 can further include completing a split transaction corresponding to one of the split transaction instructions on the instruction-address-data serial bus while a select signal is active 1890-5. A select signal can vary between different completed split transactions.

Once a split transaction is completed, the select signal(s) can be deactivated 1890-6.

A method 1890 can include determining if a last of the pipelined transactions has been completed 1890-7. If a last of the pipelined transactions has not been completed (N from 1890-7), a method 1890-3 can proceed to a next pipelined transaction 1890-8.

It is noted that transactions can be completed in a different order from that by which they were initiated by the pipelined split transaction instructions.

In some embodiments, a method 1890 can be executed by a controller (e.g., host) device as described herein or an equivalent.

Figure 19:
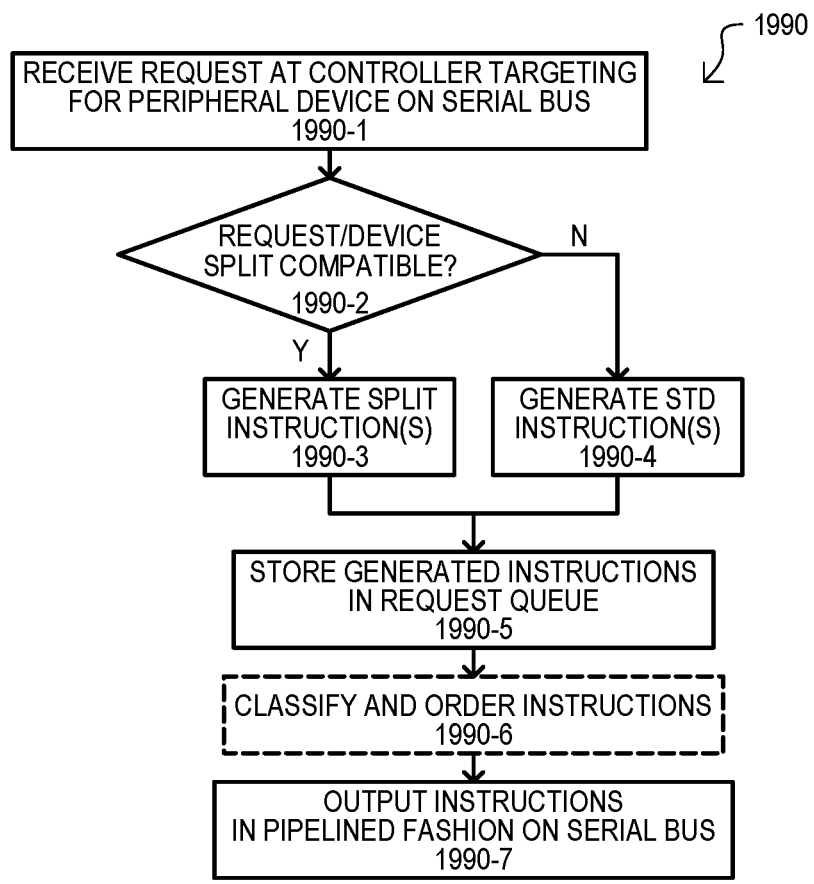
FIG. 19 is a flow diagram of a method for generating instructions for split transactions to embodiments.

FIG. 19 is a flow diagram of a method 1990 according to a further embodiment. A method 1990 can include receiving a request at a controller device targeting a peripheral device on a serial bus 1990-1. A method 1990 can determine if the received request corresponds to a transaction that can be split as described herein or an equivalent, and if the targeted device is compatible with such split transactions 1990-2.

If a received request does not correspond to a split transaction or the target device cannot process split transactions (N from 1990-2), a method 1990 can generate one or more standard instructions corresponding to the request 1990-4. If a received request does correspond to a split transaction and the target device can process split transactions (Y from 1990-2), a method 1990 can generate one or more split instructions 1990-3. Split instructions 1990-3 can include one instruction to initiate a transaction and, in some embodiments, another instruction to complete the transaction.

Generated instructions can be stored in a request queue 1990-5.

Optionally, instructions can be classified and ordered 1990-6. Such an action can include scheduler operation prioritizing requests based on predetermined criteria.

Instructions can then be output in a pipelined fashion on the serial bus 1990-7.

According to embodiments, pipelined split transactions can be executed on a serial bus to improve throughput. For read operations to peripheral devices having a latency, throughput can be nearly doubled. Embodiments can be greatly beneficial to applications having relatively small (e.g., byte sized) data transfers.

Embodiments can provide greater throughput on a serial bus without disadvantageously increasing a pin count.

Embodiments can advantageously reduce power consumption by disabling a serial clock during latency periods. This is in contrast to conventional approaches that maintain a serial clock during operations.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
by operation of a host device, initiating a first transaction with at least a first device on a serial bus in synchronism with a clock, the first transaction having a predetermined response latency;
by operation of the host device, initiating a second transaction on the serial bus in synchronism with the clock signal during the response latency;
completing the first transaction on the serial bus in synchronism with the clock; and
completing the second transaction on the serial bus in synchronism with the clock; wherein
the serial bus is configured to transmit instruction data identifying transactions, target data identifying a destination for transactions, and data for transactions;
initiating the first transaction includes the host device transmitting a first instruction on the serial bus in synchronism with the clock for receipt by the first device to access memory cells therein while activating a first select signal separate from the serial bus, and
completing the first transaction includes the host device transmitting a completion indication for receipt at the first device in synchronism with the clock to complete the access to memory cells indicated by the first instruction, the completion indication including activating the first select signal.

2. The method of claim 1, wherein the completion indication comprises a second instruction transmitted by the host device on the serial bus for receipt by the first device.

3. The method of claim 1, wherein:
initiating the second transaction further includes deactivating the first select signal and activating a second select signal separate from the serial bus.

4. The method of claim 1, wherein:
initiating the first transaction includes transmitting a memory access instruction and memory address on the serial bus.

5. The method of claim 1, further including completing the second transaction prior to the completing the first transaction.

6. The method of claim 1, wherein:
the first transaction includes accessing a portion of a first memory device; and
the second transaction is selected from the group of: accessing a second memory device and accessing another portion of the first memory device.

7. The method of claim 1, further including:
generating a clock signal; and
after initiating the second transaction, disabling the clock signal for a portion of the response latency.

8. A device, comprising:
at least one memory cell array;
at least one serial bus interface configured to receive instruction data, address data, and write data over a serial bus, and transmit read data over the serial bus;
a select input separate from the serial bus and configured to receive a first select signal; and
control circuits configured to split transactions, including
in response to the first select signal being activated, a first instruction being received from the serial bus, and the first select signal being subsequently deactivated, execute a first portion of a first transaction to access the at least one memory cell array indicated by the first instruction, and
in response to receiving a first completion indication on the serial bus with at least the first select signal being activated, completing the access to the at least one memory cell array of the first transaction by outputting data on the serial bus; wherein
the first completion indication is received by the device and generated by another device.

9. The device of claim 8, wherein:
the first instruction includes a read instruction; and
the control circuits are configured to
- access the at least one memory cell array to store read data in an output storage circuit in the first portion of the first transaction, and
- output the read data on the serial bus to complete the first transaction.

10. The device of claim 8, wherein:
the control circuits are configured to
- in response to a second instruction received from the serial bus in synchronism with the clock signal, execute a first portion of a second transaction indicated by the second instruction, and
- in response to receiving a second completion indication to completing the second transaction by outputting second data on the serial bus.

11. The device of claim 10, wherein:
the at least one memory cell array includes a plurality of banks;
the first portion of the first operation accesses a first bank; and
the first portion of the second operation accesses a second bank.

12. The device of claim 8, wherein the completion indication further comprises any selected from the group of: a completion instruction received on the serial bus from the other device, a signal separate from the serial bus generated by the device, and a signal separate from the serial bus generated by the other device.

13. The device of claim 8, wherein the at least one serial bus interface is configured to receive and transmit data in synchronism with consecutive rising and falling edges of a clock signal.

14. The device of claim 8, wherein:
the control circuits are configured to
- in response to a predetermined instruction received from the serial bus in synchronism with the clock, return parameter information indicating the device can execute split transactions.

15. The device of claim 8, wherein the at least one memory array comprises at least one array of NOR flash memory cells.

16. A system, comprising:
a host device comprising
- at least one serial bus interface coupled to a serial bus and configured to transmit instruction data, address data, and write data over a serial bus, and receive data over the serial bus; and
- controller circuits configured to execute pipelined split transactions on the serial bus, including
  - initiating a first transaction with at least one peripheral device on the serial bus in synchronism with a clock, the first transaction having a predetermined response latency,
  - initiating a second transaction with the at least one peripheral device on the serial bus in synchronism with the clock during the response latency,
  - completing the first transaction on the serial bus in synchronism with the clock, and
  - completing the second transaction on the serial bus in synchronism with the clock; wherein
  - initiating the first transaction includes the host device transmitting a first instruction on the serial bus directly to the at least one peripheral device to access memory cells therein while activating a first select signal separate from the serial bus, and
  - completing the first transaction includes the host device transmitting a completion indication on the serial bus directly to the at least one peripheral device to complete the access to memory cells indicated by the first instruction while activating the first select signal.

17. The system of claim 16, wherein the completion indication further includes a signal separate from the serial bus.

18. The system of claim 16, further including:
the at least one peripheral device coupled to the serial bus and configured to
- execute a first portion of a first operation in response to initiating the first transaction, and
- complete the first operation in response to an input from the host device to complete the first transaction.

19. The system of claim 18, further including:
a second peripheral device coupled to the serial bus and configured to
- execute a first portion of a second operation in response initiating the second transaction, and
- complete the second operation in response to an input from the host device to complete the second transaction.

20. The system of claim 19, wherein:
the at least one peripheral device is a memory device having the first response latency;
the second peripheral device is a memory device having a second response latency shorter than the first access latency; and
the second transaction is completed prior to the first transaction.

21. The system of claim 18, wherein:
the at least one peripheral device is a memory device having a plurality of banks;
the first transaction is an access to a first bank; and
the second transaction is an access to a second bank.

* * * * *